(12) United States Patent
Plott et al.

(10) Patent No.: US 11,267,193 B2
(45) Date of Patent: Mar. 8, 2022

(54) METHOD OF FORMING POROUS THREE-DIMENSIONAL (3D) ARTICLE

(71) Applicants: Dow Silicones Corporation, Midland, MI (US); The Regents of the University of Michigan, Ann Arbor, MI (US)

(72) Inventors: Jeffrey Plott, Algonac, MI (US); Herschel Henry Reese, Midland, MI (US); Albert J. Shih, Ann Arbor, MI (US); Xiaoqing Tian, Ann Arbor, MI (US); Hongjun Wang, Ann Arbor, MI (US); Bizhong Zhu, Midland, MI (US)

(73) Assignees: Dow Silicones Corporation, Midland, MI (US); The Regents of the University of Michigan, Ann Arbor, MI (US)

( * ) Notice: Subject to any disclaimer, the term of this patent is extended or adjusted under 35 U.S.C. 154(b) by 149 days.

(21) Appl. No.: 16/499,005

(22) PCT Filed: Mar. 30, 2018

(86) PCT No.: PCT/US2018/025348
§ 371 (c)(1),
(2) Date: Sep. 27, 2019

(87) PCT Pub. No.: WO2018/183806
PCT Pub. Date: Oct. 4, 2018

(65) Prior Publication Data
US 2020/0047404 A1  Feb. 13, 2020

Related U.S. Application Data

(60) Provisional application No. 62/479,016, filed on Mar. 30, 2017.

(51) Int. Cl.
*B33Y 10/00* (2015.01)
*B29C 64/10* (2017.01)
(Continued)

(52) U.S. Cl.
CPC ............ *B29C 64/118* (2017.08); *B33Y 10/00* (2014.12); *B01J 31/1608* (2013.01);
(Continued)

(58) Field of Classification Search
CPC .............................. B33Y 10/00; B29C 64/118
See application file for complete search history.

(56) References Cited

U.S. PATENT DOCUMENTS 3,046,178 A * 7/1962 Tupper .................... B29C 48/50
156/167
9,079,337 B2 * 7/2015 Lipton ................ B29C 37/0025
(Continued)

FOREIGN PATENT DOCUMENTS

CN    105711102 A    6/2016
EP     1827523 A2    9/2007
(Continued)

OTHER PUBLICATIONS

International Search Report for PCT/US2018/025348 dated Jun. 28, 2018, 5 pages.
(Continued)

*Primary Examiner* — Cachet I Proctor
(74) *Attorney, Agent, or Firm* — Warner Norcross + Judd LLP

(57) ABSTRACT

A method of forming a porous three-dimensional (3D) is disclosed. The method comprises (I) printing a first composition on a substrate (16) with the nozzle (12) of the apparatus (10) to form at least one first filament (14) comprising the first composition, (II) selectively controlling the distance and/or the speed such that the at least one first
(Continued)

filament coils on the substrate to give a first layer on the substrate, the first layer comprising a coiled filament, optionally repeating steps I) and II) with independently selected composition(s) for any additional layer(s), and (III) exposing the layer(s) to a solidification condition. A porous three-dimensional (3D) article formed in accordance with the method is also disclosed.

11 Claims, 6 Drawing Sheets

(51) Int. Cl.
*B29C 64/118* (2017.01)
*B01J 31/16* (2006.01)
*B28B 1/00* (2006.01)
*B29C 67/04* (2017.01)

(52) U.S. Cl.
CPC ......... *B01J 2531/828* (2013.01); *B28B 1/001* (2013.01); *B29C 67/04* (2013.01)

(56) References Cited

U.S. PATENT DOCUMENTS

| | | | | |
|---|---|---|---|---|
| 9,126,365 | B1* | 9/2015 | Mark | B29C 31/042 |
| 2007/0036964 | A1 | 2/2007 | Rosenberger et al. | |
| 2009/0078003 | A1* | 3/2009 | Cook | B01F 15/0203 65/126 |
| 2014/0356585 | A1* | 12/2014 | Duoss | B32B 5/26 428/174 |
| 2017/0030399 | A1* | 2/2017 | Sanders | B64C 1/06 |
| 2018/0326669 | A1 | 11/2018 | Chen et al. | |

FOREIGN PATENT DOCUMENTS

| | | |
|---|---|---|
| GB | 2502116 A | 11/2013 |
| JP | H06166111 A | 6/1994 |
| KR | 20140137142 A * | 12/2014 |

OTHER PUBLICATIONS

Neil M. Ribe, Proc. R. Soc. Lond. A (2004) 460, 3223-3239, "Coiling of viscous jets".

Machine assisted English translation of JPH06166111A obtained from https://worldwide.espacenet.com on Jun. 19, 2021, 14 pages.

* cited by examiner

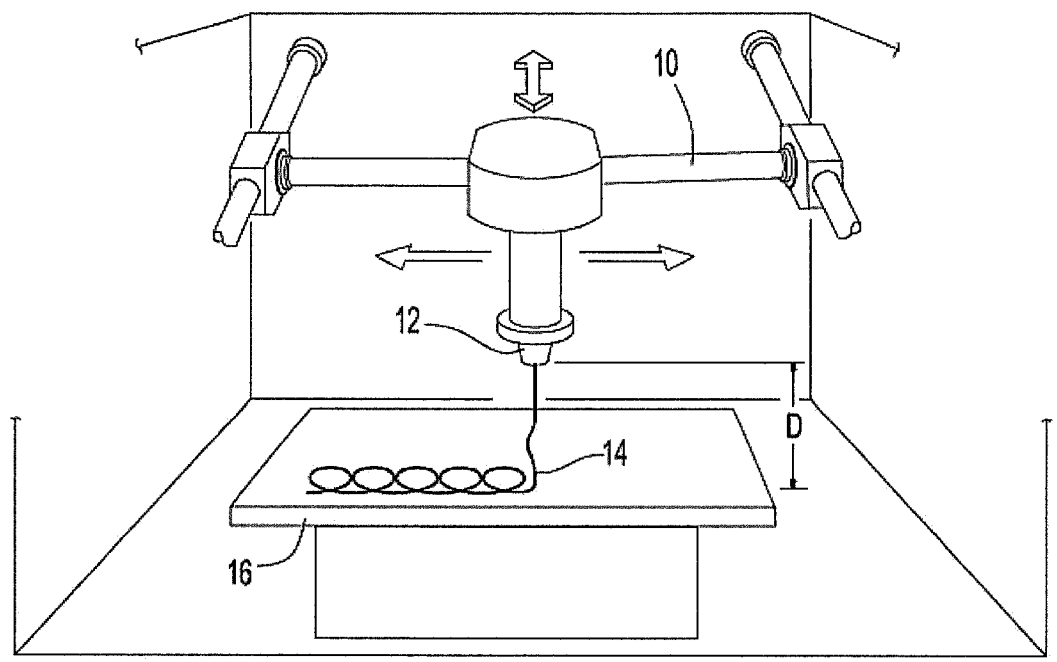
Fig - 1
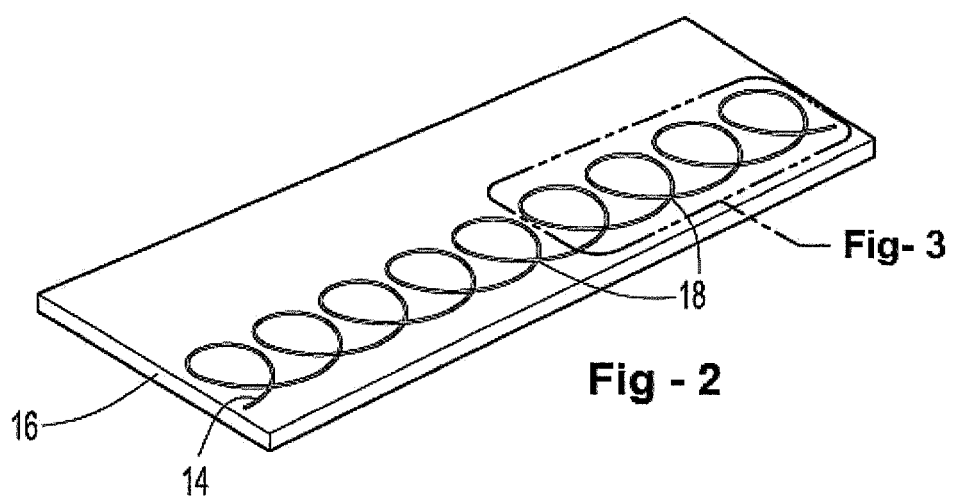
Fig - 3
Fig - 2

Fig - 5.1
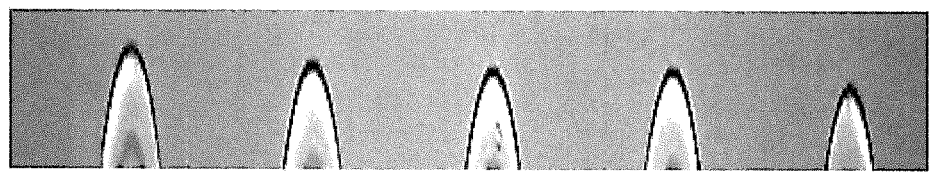
Fig - 5.2
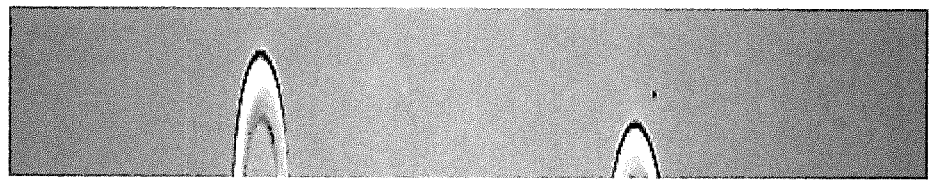
Fig - 5.3
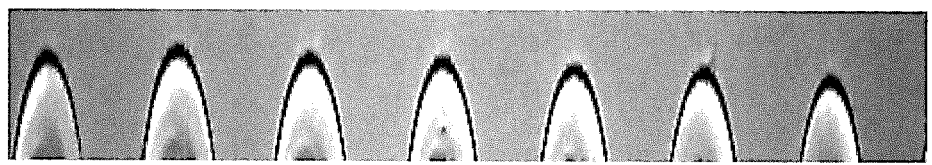
Fig - 5.4
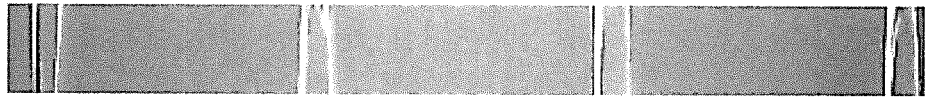
Fig - 5.5
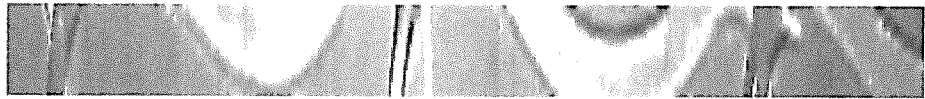
Fig - 5.6

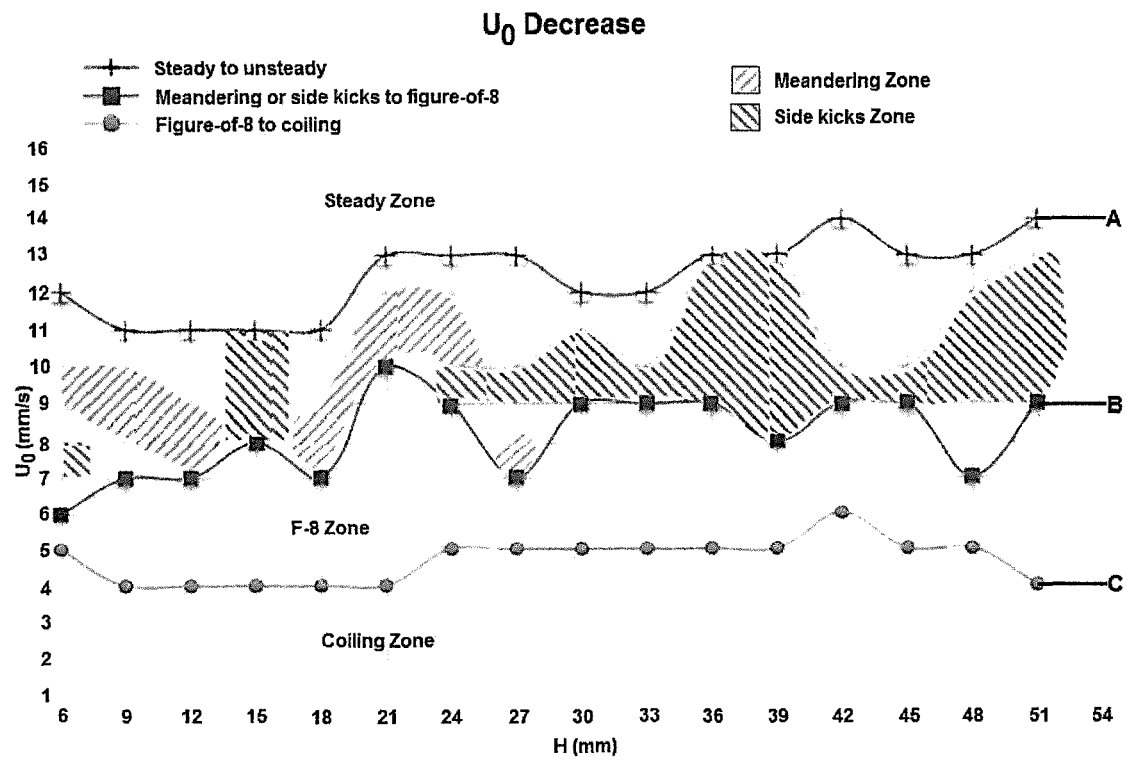
Fig - 6.1
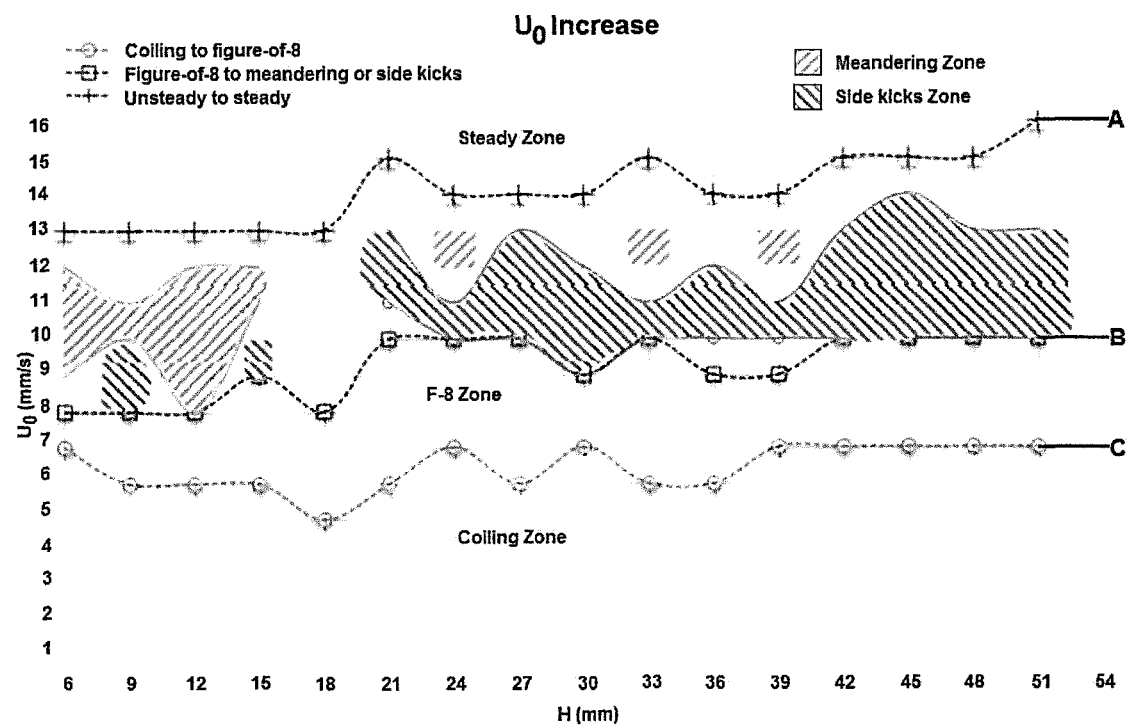
Fig - 6.2

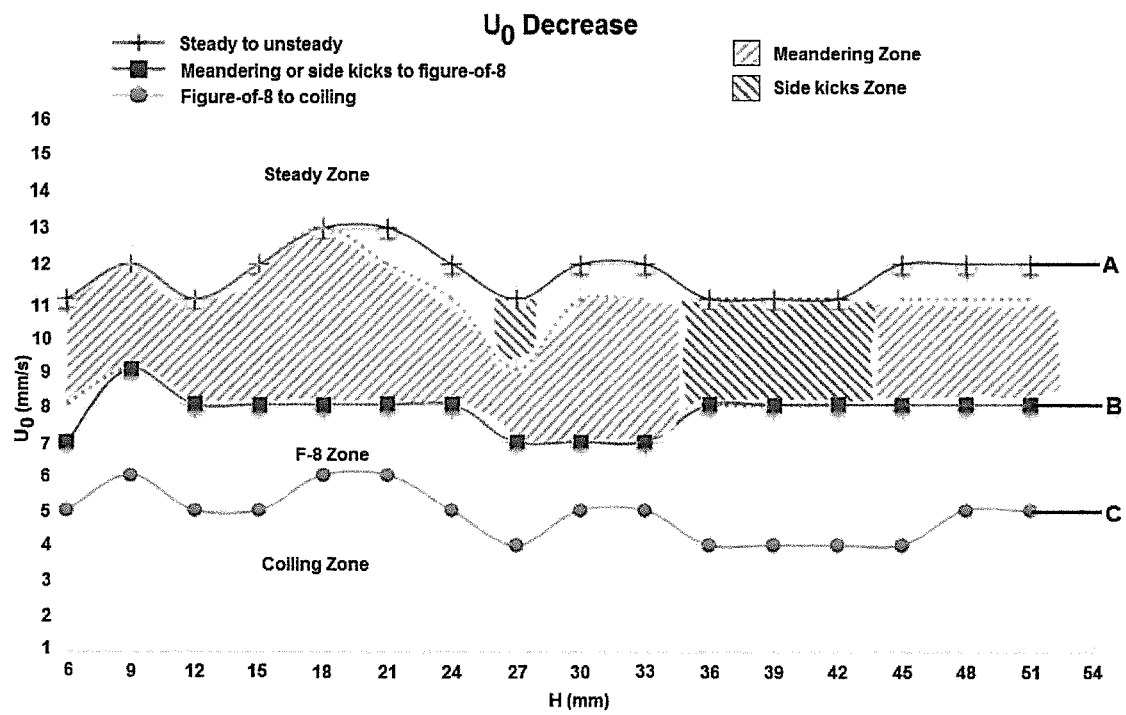
Fig - 6.3
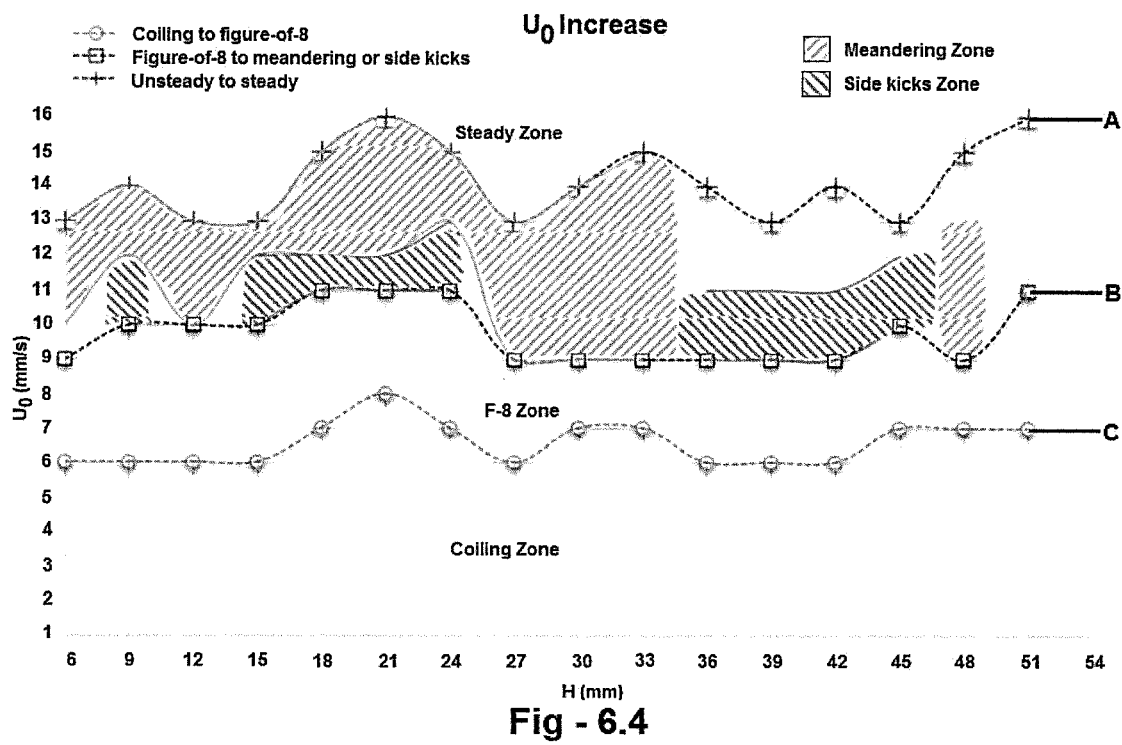
Fig - 6.4

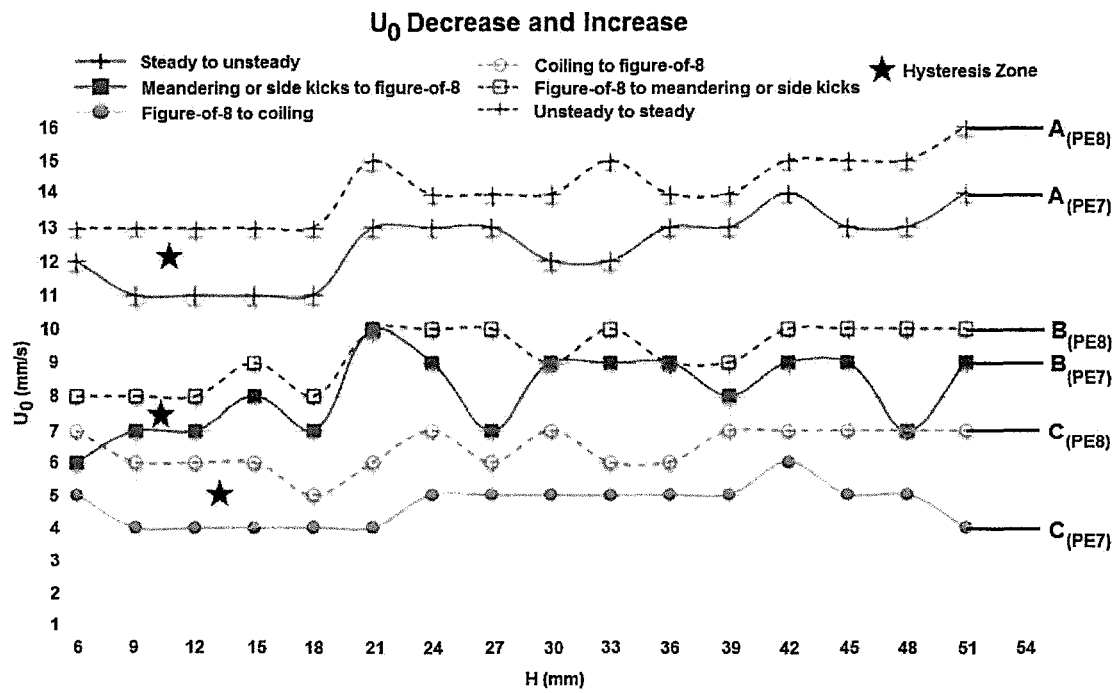
Fig - 6.5
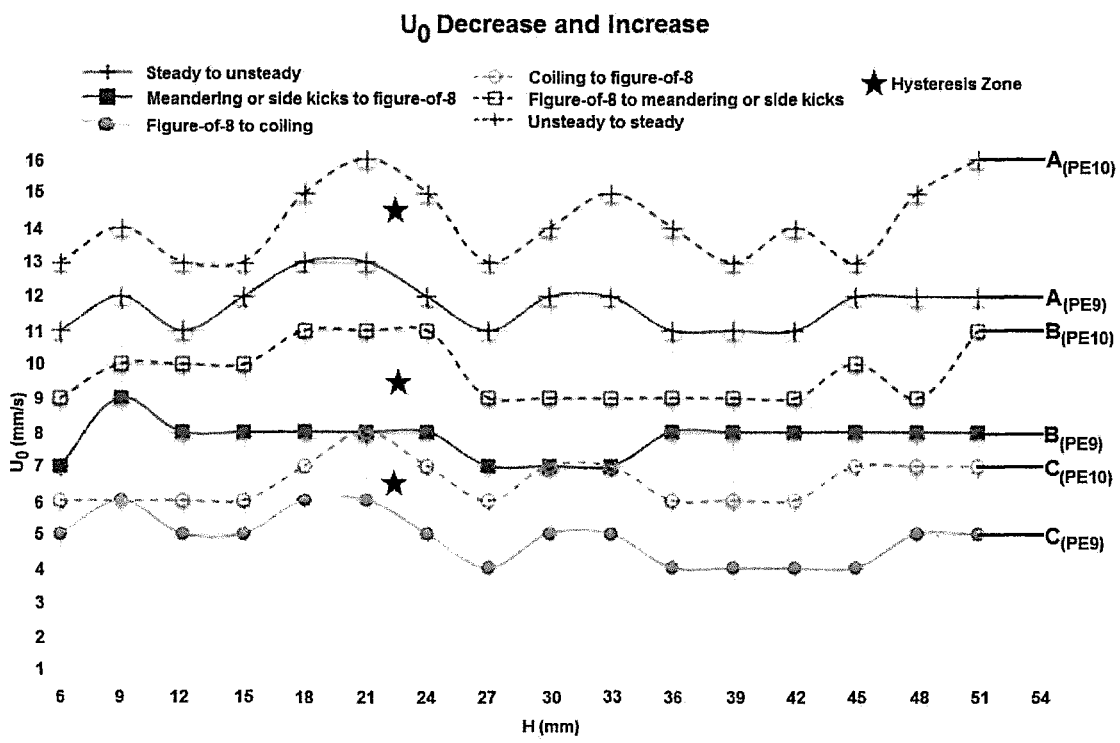
Fig - 6.6

METHOD OF FORMING POROUS THREE-DIMENSIONAL (3D) ARTICLE

CROSS-REFERENCE TO RELATED APPLICATIONS

This application is the National Stage of International Application No. PCT/US2018/025348 filed on 30 Mar. 2018, which claims priority to and all advantages of U.S. Application No. 62/479,016 filed on 30 Mar. 2017, the contents of which are hereby incorporated by reference.

FIELD OF THE INVENTION

The present invention generally relates to a method of forming an article and, more specifically, to a method of forming a porous three-dimensional (3D) article with an apparatus having a nozzle, and to the porous 3D article formed thereby.

DESCRIPTION OF THE RELATED ART 3D printing or additive manufacturing (AM) is a process of making three-dimensional (3D) solid objects, typically from a digital file. The creation of a 3D printed object is achieved using additive processes rather than subtractive processes. In an additive process, an object is created by laying down successive layers of material until the entire object is created. Each of these layers can be seen as a thinly sliced horizontal cross-section of the eventual object.

Additive processes have been demonstrated with certain limited types of materials, such as organic thermoplastics (e.g. polylactic acid (PLA) or acrylonitrile butadiene styrene (ABS)), plaster, clay, room temperature vulcanization (RN) materials, paper, or metal alloys. These materials are unsuitable in certain end applications based on physical or chemical limitations, cost, slow solidification (or cure) times, improper viscosity, etc.

Other additive processes utilize heat-curable organic polymers. However, these conventional additive processes suffer from challenges associated with consistent and uniform heating and curing of various layers, particularly as the object is built with an increasing thickness during 3D printing.

SUMMARY OF THE INVENTION

Disclosed is a method of forming a porous three-dimensional (3D) article with an apparatus having a nozzle. The method comprises I) printing a first composition on a substrate with the nozzle of the apparatus to form at least one first filament comprising the first composition, wherein the substrate and the nozzle are spaced a distance from one another and at least one of the substrate and the nozzle is moved at a speed relative to the other during step I). The method further comprises II) selectively controlling the distance and/or the speed such that the at least one first filament coils on the substrate to give a first layer on the substrate, the first layer comprising a coiled filament, wherein the coiled filament has a width and a period length. Optionally, steps I) and II) may be repeated with independently selected composition(s) for any additional layer(s). The method also comprises III) exposing the layer(s) to a solidification condition. The porous three-dimensional (3D) article defines a plurality of voids.

A porous three-dimensional (3D) article formed in accordance with the method is also disclosed.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic view of one embodiment of an apparatus and a nozzle for carrying out the inventive method;

FIG. 2 is a schematic view of a coiled filament prepared in accordance with one embodiment of the inventive method;

FIGS. 5.1-5.6 are pictures of side profiles of filaments being printed by the nozzle; and FIGS. 6.1-6.6 are regime diagrams of Preparative Examples 7-10 prepared in accordance with the inventive method and described herein.

DETAILED DESCRIPTION OF THE INVENTION

Figure 3:
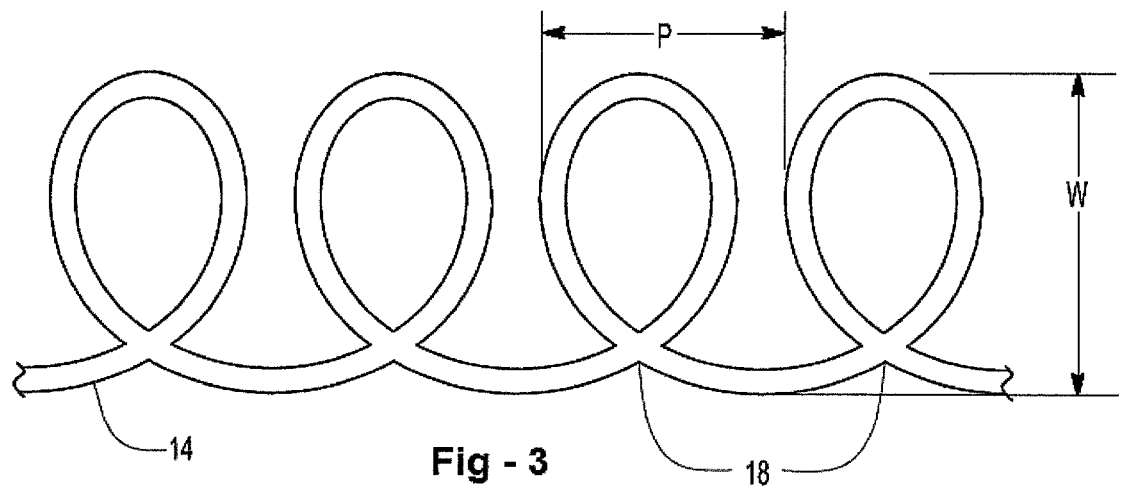
FIG. 3 is an expanded view of a portion of the coiled filament shown in FIG. 2.

The present invention provides a method of forming a porous three-dimensional (3D) article, which defines a plurality of voids. The porous 3D article is formed with independently selected compositions, which are described below, along with various aspects relating to the porous 3D article formed in accordance with the inventive method. The porous 3D article may be customized for myriad end use applications and industries. For example, as described below, the porous 3D article may be a compressible foam utilized in cushion and support applications. Alternatively or in addition, the porous 3D article may be a rigid foam utilized in construction applications.

The porous 3D article is formed with an apparatus having a nozzle. In certain embodiments, the apparatus may be a 3D printer. However, the apparatus may be any apparatus having a nozzle from which a composition may be dispensed. Generally, however, any apparatus capable of dispensing a material for building 3D articles is referred to or encompassed by the scope of a 3D printer.

This disclosure generally incorporates by reference in its entirety ASTM Designation F2792-12a, "Standard Terminology for Additive Manufacturing Technologies." Under this ASTM standard, "3D printer" is defined as "a machine used for 3D printing" and "3D printing" is defined as "the fabrication of objects through the deposition of a material using a print head, nozzle, or another printer technology". "Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication". AM may also be referred to as rapid prototyping (RP). As used herein, "3D printing" is generally interchangeable with "additive manufacturing" and vice versa.

The method of this disclosure can mimic any one of the aforementioned 3D printing processes, or other 3D printing processes understood in the art. Specific examples of suitable 3D printing processes are also described in U.S. Pat. Nos. 5,204,055 and 5,387,380, the disclosures of which are incorporated herein by reference in their respective entireties.

3D printing is generally associated with a host of related technologies used to fabricate physical objects from computer generated data sources. Some of these specific processes are included above with reference to specific 3D printers. Further, some of these processes, and others, are described in greater detail below.

In general, 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however, other file formats can also or additionally be used. The file is generally read into 3D printing software, which takes the file and optionally user input to separate it into hundreds, thousands or even millions of "slices". The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

The nozzle and/or build platform generally moves in the X-Y (horizontal) plane before moving in the Z-axis (vertical) plane once each layer is complete. In this way, the object which becomes the porous 3D article is built one layer at a time from the bottom upwards. This process can use material for two different purposes, building the object and supporting overhangs in order to avoid extruding material into thin air.

In various embodiments, the method of this disclosure mimics a conventional material jetting process. Material jetting printers often resemble traditional paper printers, e.g. inkjet printers. In material jetting, a print head moves around a print area jetting the particular composition. Repeating this process builds up the object one layer at a time.

Optionally, the resulting objects may be subjected to different post-processing regimes, such as further heating, solidification, infiltration, bakeout, and/or firing. This may be done, for example, to expedite cure of any binder, to reinforce the porous 3D article, to eliminate any curing/cured binder (e.g. by decomposition), to consolidate the core material (e.g. by sintering/melting), and/or to form a composite material blending the properties of powder and binder.

The method comprises the step of I) printing a first composition with the nozzle of the apparatus. Various types of nozzles, apparatuses (e.g. 3D printers) and/or 3D printing methodologies (i.e., "3D printing processes") can be utilized, as described in detail below. As also described below, various types of compositions can be utilized in the inventive method, which may be the same as or different from one another and are independently selected. The first composition may be curable or otherwise capable of solidification upon application of a solidification condition, as described below in regards to suitable compositions for use in the method.

In various embodiments, the method of this disclosure mimics a conventional material extrusion process. Material extrusion generally works by extruding material (in this case, the first composition) through a nozzle to print one cross-section of an object, which may be repeated for each subsequent layer. The nozzle may be heated, cooled or otherwise manipulated during printing, which may aid in dispensing the particular composition.

The nozzle may comprise any dimension and be of any size and/or shape. Typically, the dimensions of the nozzle are selected based on the particular apparatus, first composition, and any other compositions used to practice the method. Typically, the nozzle comprises an internal diameter (ID) of from 0.001 to 100 mm, such as from 0.05 to 7 mm. However, it is to be appreciated that one or more additional nozzles may be used to practice the method in addition to the nozzle, with any of the one or more additional nozzles being selected based on any of the compositions being utilized, the particular layer being formed, the dimensions of the porous 3D article being formed, etc.

The first composition is printed on a substrate. The substrate is not limited and may be any substrate. The substrate typically can support the porous 3D article during its method of forming. However, the substrate may itself be supported, e.g. by a table, such that the substrate itself need not have rigidity. The substrate may be rigid or flexible, and may be discontinuous or continuous in at least one of thickness and composition. The substrate may include a coating or other film disposed thereon, and the substrate may be removable, e.g. peelable, from the porous 3D article. Alternatively, the porous 3D article may physically and/or chemically bond to the substrate such that the porous 3D article and the substrate are integral together. In one embodiment, the substrate may comprise a silicone substrate, e.g. an already cured silicone. The substrate may be a mold or any other object or article.

The substrate and nozzle are spaced a distance from one another during printing. The distance is chosen on a number of factors, such as dimensions of the nozzle, selection of the first composition and its properties (including viscosity), etc., as described below, the desired thickness of the layer, and the desired dimensions of the porous 3D article being formed. For example the distance between the nozzle and the substrate may be in the range of from 1 to 2000 mm, such as from 1 to 9, 10 to 99, or 100 to 2000 mm. Moreover, the distance may vary (i.e., increase and/or decrease) over time during the method.

At least one of the substrate and the nozzle is moved at a speed relative to the other during printing. The speed is also chosen based on the same or related factors (e.g. a flow rate of the first composition through the nozzle), as described in detail below, and is typically in the range of from 1 to 200 mm/s, such as from 5 to 150, 10 to 100, or 15 to 50 mm/s. Moreover, the speed may vary (i.e., increase and/or decrease) over time during the method.

The viscosity of the first composition may be any viscosity suitable for printing. Typically, the viscosity of the first composition is selected to provide the first filament a degree of self-support when formed on the substrate. As such, the viscosity may be in the range of from 1000 to 100,000,000 centipoise, such as from 30,000 to 5,000,000 centipoise. The viscosity of the first composition may be altered (i.e. increased or decreased) by heating or cooling the first composition, e.g. via heat transfer to or from the nozzle or the substrate, altering the ambient conditions, etc., as described below.

Ambient conditions may be manipulated or controlled during printing. For example, if desired, the substrate may be heated, cooled, mechanically vibrated, or otherwise manipulated before, during, and/or after the steps of printing to assist with solidification and/or curing. Further, the nozzle may be heated or cooled before, during, and/or after printing the first composition. As introduced above, more than one nozzle may be utilized with each nozzle having independently selected properties or parameters. The method may be carried out in a heated or a moisturized environment such that solidification and/curing initiates after each step of printing.

More specifically, relative to printing, printing the first composition with the nozzle of the apparatus forms at least one first filament comprising the first composition. By selectively controlling the distance and/or the speed during printing, the at least one first filament coils on the substrate to give a first layer on the substrate. The first layer comprises a coiled filament. The terms "coiled filament" and "first layer" may be utilized interchangeably herein despite the coiled filament having configurations distinguished from conventional layers or films. For example, the first layer may comprise any number of coiled filaments in any configuration.

By way of example, as shown in the embodiment of FIG. 1, the apparatus 10 includes the nozzle 12. The nozzle 12 prints the first composition, which forms the first filament 14. The nozzle 12 is spaced from the substrate 16 by the distance D. The first filament 14 coils on the substrate 16 to give the coiled filament.

The at least one first filament comprising the first composition may comprise a single filament, alternatively a plurality of filaments. The filament, or plurality of filaments, of the at least one first filament comprising the first composition is referred to herein merely as "the filament" for purposes of clarity, which extends to and encompasses a single filament or a plurality of filaments, which may be independently selected and formed in the first layer. Similarly, when the at least one first filament comprises a plurality of filaments, the first layer may comprise a plurality of coiled filaments. Further still, a single filament may comprise a plurality of coils, which are independently sized and dimensioned. The coiled filament, or plurality of coiled filaments, of the first layer are referred to herein as merely "the coiled filament" for purposes of clarity, which extends to and encompasses a single coiled filament or a plurality of coiled filaments.

As shown in the embodiment of FIG. 2, the first filament 14 coils on the substrate 16 to give the coiled filament. The coiled filament includes intersecting points 18 for each coil, as described in further detail below. As shown in FIG. 3, the coiled filament has a width W and a period length P. More specifically, when the coiled filament comprises a plurality of coils, the width and period length may vary and be independently selected. The width and the period length are limited only by dimensions of the apparatus and substrate, and can be scaled up as desired based on end use applications of the porous 3D article.

In particular, as the first composition is dispensed from the nozzle of the apparatus in the form of the first filament, the first filament generally coils on the substrate. Coiling of the first filament is typically a function of a number of variables, including a radius (or diameter) of the first filament, the flow rate of the first composition through the nozzle, the distance between the nozzle and the substrate, and the selection of the first composition (and its viscosity). The first filament typically beings to coil prior to first contacting the substrate. This may be known as the rope coil effect, or liquid rope coiling.

Depending on these variables, the first filament may coil in a number of distinct modes. The first filament may coil via viscous coiling, gravitational coiling, and/or inertial coiling. Such modes of coiling are generally known in connection with natural coiling of viscous fluids when dispensed from sufficient heights. Viscosity, gravity, and/or inertia are generally responsible for such coiling, and the dominant force dictates the naming scheme.

In viscous coiling, gravity and inertia are generally negligible such that coiling is driven by dispensing of the first composition. In gravitational coiling, gravitational forces balance viscous forces such that the first filament has a long tapering tail during printing. In inertial coiling, inertia balances viscous forces. Other modes of coiling are also possible in view of the number of variables that influence such coiling. Such coiling is understood in the art of fluid dynamics, e.g. in Ribe, Neil M. "Coiling of viscous jets." *Proceedings of the Royal Society of London A: Mathematical, Physical and Engineering Sciences*. Vol. 460. No. 2051. The Royal Society, 2004, which is incorporated by reference herein in its entirety.

Generally, printing the first composition would result in the formation of a stacked coil on the substrate, as the first filament would generally coil on itself to give the stacked coil. The stacked coil would grow in the Z-axis direction while maintaining a constant diameter in the X-Y horizontal plane. However, at least one of the substrate and the nozzle is moved at a speed relative to the other during printing. When both of the substrate and the nozzle are moved, the speed refers to the total or cumulative speed of the substrate and/or the nozzle relative to a stationary object, e.g. the apparatus. Moving at least one of the substrate and the nozzle results in the first filament having the period length, as shown in FIG. 3. The period length is analogous to a wavelength if each coil of the first filament is considered a wave, e.g. the period length is from crest to crest or from trough to trough of adjacent coils. Because each coil of the first filament may be independently selected, the period length may differ with respect to each coil. Moving at least one of the substrate and the nozzle relative to the other forms the coils in the X-Y horizontal plane.

For example, in the embodiment shown in FIGS. 2 and 3, the first filament intersects itself at one intersecting point 18 for each coil. Each individual coil of the first filament is spaced by the period length P. Each of the coils may be similarly or identically shaped and dimensioned, or independently shaped and dimensioned. For example, the speed and/or the distance may vary during printing. Even for a consistent width W of the coils, the period length P may be decreased such that adjacent coils intersect with one another, e.g. such that adjacent coils overlap and intersect at one or more interesting points. This is also true when the coils have non-circular orientations, e.g. when the first filament coils as a figure-of-eight. Depending on a selection of the first composition, the first filament may be physically and/or chemically bonded to itself, e.g. at the intersecting point 18. For example, components of the first composition may cure across the intersecting point 18. Alternatively, the first filament may merely contact or be adjacent itself at the intersecting point 18 without physical and/or chemical bonding.

The first filament may be randomized, patterned, woven, non-woven, continuous, discontinuous, or may have any other form or combinations of forms. For example, the first filament may be a mat, a web, or have other orientations. The first filament may fuse together in various locations, impacting dimension and defining voids.

The first filament may have a continuous or discontinuous radius or diameter. Typically, the first filament has a radius or diameter that corresponds to an inner diameter defined by the nozzle. However, the first filament may expand during or after printing, and/or may retract (e.g. from solidification or curing). The first filament may be hollow, or define voids or recesses. The first filament need not have a circular cross-section; the cross-section of the first filament may be any shape or size.

During printing, the distance and/or the speed are selectively controlled, which influences the coiling of the first filament to give the first layer comprising the coiled filament on the substrate. The distance and speed are each selected based on one another, as well as dimensions of the nozzle, selection of the first composition and its properties (including viscosity), etc. In contrast to the inventive method, in conventional 3D printing processes, it is undesirable for a printed filament to coil, as the printed filaments are intended to have specific patterns and shapes. Thus, in such conventional 3D printing processes, conventional distances are typically selected such that there is no coiling of the printed filament.

Selectively controlling the distance and/or speed during printing may first require determining target properties of the first layer, e.g. a desired width and/or desired period length of the coiled filament. The method may also comprise first plotting for the nozzle and the first composition speed as a function of distance when printing the first composition with the nozzle. This establishes parameters to selectively control the distance and/or the speed during printing. This plotting step may not be required for certain apparatuses, nozzles and compositions for which these properties are already known, e.g. from prior printing steps. However, in other embodiments, these operating parameters are identified through plotting with a trial run, e.g. before implementing the inventive method. Typically, the coiled filament is formed while at least one of the nozzle and the substrate move in a linear fashion relative to the other, i.e., the substrate and the nozzle typically do not move in a spiral or circular fashion in connection with forming the coiled filament of the first layer.

Forming the first layer may comprise printing successive or iterative coils of the first filament in a single printing step. For example, although at least one of the substrate and the nozzle is moved relative to the other during printing, printing may occur at the same location on the substrate, i.e., at the same spot on the X-Y horizontal plane. Successive coils may be formed on or overlapping with one another. The porous 3D article may be a single filament, which may be randomized, nonrandomized, patterned, nonpatterned, etc.

Optionally, steps I) and II) may be repeated with independently selected composition(s) for additional layer(s) as desired. For example, in certain embodiments, the method further comprises IV) printing a second composition with the nozzle of the apparatus on the first layer. The second composition may be printed in any manner, e.g. in a manner similar to the first composition such that the second composition forms at least one second filament, or in a conventional manner, e.g. such that the second composition is printed as a continuous film. The second composition may be printed, for example, in any matter as disclosed in U.S. Application No. 62/478,991, which is filed herewith and incorporated by reference herein.

In specific embodiments, the method further comprises IV) printing a second composition with the nozzle of the apparatus to form at least one second filament comprising the second composition on the first layer. In these or other embodiments, the first layer and the nozzle are spaced a distance from one another and at least one of the substrate and the nozzle is moved at a speed relative to the other during IV) printing. The distance between the first layer and the nozzle may be the same as the distance between the substrate and the nozzle, and the distance may be dynamic. For example, the distance may change in real time, as the substrate and/or nozzle may move vertically (i.e., in a Z vertical plane) in addition to laterally (i.e., in the X-Y horizontal plane). The first layer may still be disposed on the substrate during IV), or may be removed from the substrate such that the first layer serves as the substrate for the second filament without any further underlying layers/support.

In certain embodiments comprising the step of IV) printing the second composition, the method also comprises V) selectively controlling the distance and/or the speed such that the at least one second filament coils on the first layer to give a second layer on the first layer, the second layer comprising a coiled filament. The coiled filament of the second layer is independently selected from the coiled filament of the first layer in all respects. However, any description above relative to the coiled filament of the first layer is also applicable to the coiled filament of the second layer but not repeated herein for purposes of brevity. The coiled filaments of the first and second layers, or any subsequent or additional layers, may be independent orientations.

The second layer may only contact a portion of an exposed surface of the first layer. For example, depending on the desired shape of the porous 3D article, the second layer may build on the first layer selectively.

The second composition may be the same as or different from the first composition utilized to form the first layer. Any description above relative to I) printing the first composition to form the first layer is also applicable to IV) printing the second composition on the first layer to form the second layer, and each aspect of each printing step is independently selected. As described in greater detail below, the method may optionally comprise repeating steps I) and II) (and/or steps III) and/or IV)) with independently selected composition(s) for any additional layer(s). The first layer, second layer (or subsequent or latter layer), and any additional layer(s), optionally included as described below, are referred to collectively herein as "the layers." "The layers," as used herein in plural form, may relate to the layers at any stage of the inventive method, e.g. in an unsolidified and/or uncured state, in a partially solidified and/or partially cured state, in a solidified or a final cure state, etc. Generally, any description below relative to a particular layer is also applicable to any other layer, as the layers are independently formed and selected.

In certain embodiments, the first layer comprises the first filament and the second layer comprises the second filament. As introduced above, each of the first and second filaments may comprise a single filament or a plurality of filaments (separate from one another, intersecting, and/or branched). The first and second filaments are referred to herein as the first filament and the second filament, respectively, which extends to and encompasses each of the first and second filaments independently comprising a single filament or a plurality of filaments, which may be independently selected and formed. For example, each of the first and second filaments may independently be a mat, a web, or have other orientations. In various embodiments, the first and second non-linear filaments are the same as and continuous with one another. In this specific embodiment, the porous 3D article may comprise a single filament or strand, which may be patterned or randomized. In these embodiments, the first and second layers are not separate or discrete from one another.

The layers can each be of various dimension, including thickness and width. Thickness and/or width tolerances of the layers may depend on the apparatus, nozzle and printing process used, with certain printing processes having high resolutions and others having low resolutions. Thicknesses of the layers can be uniform or may vary, and average thicknesses of the layers can be the same or different. Depending on a configuration of the first filament, and any additional layers or filaments, the thickness may refer to an average thickness and may be uniform or non-uniform. Average thickness is generally associated with thickness of the layer immediately after printing. In various embodiments, the layers independently have an average thickness of from about 1 to about 1,000,000, about 1 to about 10,000, about 2 to about 1,000, about 5 to about 750, about 10 to about 500, about 25 to about 250, or about 50 to 100, μm. Thinner and thicker thicknesses are also contemplated. This disclosure is not limited to any particular dimensions of any of the layers. For example, the porous 3D article may comprise a single filament while having a thickness of 2 meters.

Finally, the method comprises III) exposing the layer(s) to a solidification condition. The solidification condition may be any condition which contributes to solidification of the layers. For example, solidification may be a result of curing or increasing a crosslink density of the layers. Alternatively, solidification may be the result of a physical change within a layer, e.g. drying or removing any vehicle which may be present in any of the composition(s) and/or corresponding layer(s), as described below with respect to suitable compositions. Because each layer is independently selected, the solidification condition may vary for each layer.

Depending on a selection of the particular composition, as described below, the solidification condition may be selected from: (i) exposure to moisture; (ii) exposure to heat; (iii) exposure to irradiation; (iv) reduced ambient temperature; (v) exposure to solvent; (vi) exposure to mechanical vibration; or (vii) any combination of (i) to (vi). The solidification condition typically at least partially solidifies, alternatively solidifies, the layers.

The layers may be exposed to the solidification condition at any time in the method, and exposure to the solidification condition need not be delayed until two or more layers are formed in the method. For example, they layers may be exposed to the solidification individually and/or collectively. Specifically, the first layer may be exposed to the solidification condition to at least partially solidify the first layer prior to forming the second layer thereon. In these embodiments, exposing the first layer to the solidification condition forms an at least partially solidified first layer such that IV) is further defined as IV) printing the second composition on the at least partially solidified first layer. Similarly, the second layer may be at least partially solidified prior to repeating any printing steps for additional layers. The layers may also be subjected or exposed to a solidification condition when in contact with one another, even if these layers were at least partially solidified iteratively prior to each printing step.

At least partial solidification of the layer is generally indicative of cure; however, cure may be indicated in other ways, and solidification may be unrelated to curing. For example, curing may be indicated by a viscosity increase, e.g. bodying of the layer, an increased temperature of the layer, a transparency/opacity change of the layer, an increased surface or bulk hardness, etc. Generally, physical and/or chemical properties of the layer are modified as each layer at least partially solidifies to provide the at least partially solidified layers, respectively.

In certain embodiments, "at least partially solidified" means that the particular at least partially solidified layer substantially retains its shape upon exposure to ambient conditions. Ambient conditions refer to at least temperature, pressure, relative humidity, and any other condition that may impact a shape or dimension of the at least partially solidified layer. For example, ambient temperature is room temperature. Ambient conditions are distinguished from solidification conditions, where heat (or elevated temperature) is applied. By "substantially retains its shape," it is meant that a majority of the at least partially solidified layer retains its shape, e.g. the at least partially solidified layer does not flow or deform upon exposure to ambient conditions. Substantially may mean that at least about 50%, 60%, 70%, 80%, 90%, 95%, 96%, 97%, 98%, 99%, 99.5%, 99.9%, 99.99%, or at least about 99.999% or more of the volume of the at least partially solidified layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially solidified layer upon exposure to ambient conditions. The shape of the at least partially solidified layer may also impact whether the at least partially solidified layer substantially retains its shape. For example, when the at least partially solidified layer is rectangular or has another simplistic shape, the at least partially solidified layer may be more resistant to deformation at even lesser levels of solidification than at least partially solidified layers having more complex shapes.

More specifically, prior to exposing one or more layers to the solidification condition, the first composition (as well as the second composition and any subsequent compositions) is generally flowable and may be in the form of a liquid, slurry, or gel, alternatively a liquid or slurry, alternatively a liquid. Viscosity of each composition can be independently adjusted depending on the type of apparatus and nozzle or other considerations. Adjusting viscosity can be achieved, for example, by heating or cooling any of the compositions, adjusting molecular weight of one or more components thereof, by adding or removing a solvent, carrier, and/or diluent, by adding a filler or thixotroping agent, etc.

In certain embodiments when the first layer is at least partially solidified prior to printing the second composition, printing of the second composition to form the second layer occurs before the at least partially solidified first layer has reached a final solidified state, i.e., while the at least partially solidified first layer is still "green." As used herein, "green" encompasses a partial solidified and/or a partial cure but not a final solidified and/or cure state. The distinction between partial solidification and/or cure state and a final solidification and/or cure state is whether the partially solidified and/or cured layer can undergo further solidification, curing and/or crosslinking. Functional groups of the components of the first composition may be present even in the final solidified and/or cure state, but may remain unreacted due to steric hindrance or other factors.

In these embodiments, printing of the layers may be considered "wet-on-wet" such that the adjacent layers or filaments at least physically bond, and may also chemically bond, to one another. For example, in certain embodiments, depending on a selection of the compositions, components in each of the layers or filaments may chemically cross-link/cure across the print line. Because the layers may comprise coiled filaments, the print line is referred to as any contact point between adjacent filaments, or adjacent layers. There may be certain advantages in having the cross-link network extend across the print line in relation to longevity, durability and appearance of the porous 3D article. The layers may also be formed around one or more substructures that can provide support or another function of the porous 3D article. In other embodiments, the compositions are not curable such that the layers are merely physically bonded to one another in the porous 3D article.

When the layers are applied wet-on-wet, and/or when the layers are only partially solidified and/or partially cured, any iterative steps of exposing the layers to a curing and/or solidification condition may effect cure of more than just the previously printed layer. As noted above, because the cure may extend beyond or across the print line, and because a composite including the layers is typically subjected to the solidification condition, any other partially cured and/or solidified layers may also further, alternatively fully, cure and/or solidify upon a subsequent step of exposing the layers to a curing and/or solidification condition. By way of example, the method may comprise printing the second composition to form the second layer on the at least partially solidified first layer. Prior to printing another composition to form another layer on the second layer, the second layer may be exposed to a solidification condition such that printing another composition to form another layer on the second layer comprises printing another composition to form another layer on an at least partially solidified second layer. However, in such an embodiment, exposing the second layer to the solidification condition may, depending on the selection of the first and second compositions, also further cure and/or solidify the at least partially solidified first layer. The same is true for any additional or subsequent layers.

If desired, inserts, which may have varying shape, dimension, and may comprise any suitable material, may be disposed or placed on or at least partially in any layer during the inventive method. For example, an insert may be utilized in between subsequent printing steps, and the insert may become integral with the porous 3D article upon its formation. Alternatively, the insert may be removed at any step during the inventive method, e.g. to leave a cavity or for other functional or aesthetic purposes. The use of such inserts may provide better aesthetics and economics over relying on printing alone.

Further, if desired, a composite including all or some of the layers may be subjected to a final solidification step, which may be a final cure step. For example, to ensure that the porous 3D article is at a desired solidification state, a composite formed by printing and at least partially solidifying the layers may be subjected to a further step of solidification or further steps of solidification where layers may solidify under different types of solidification conditions. The final solidification step, if desired, may be the same as or different from any prior solidification steps, e.g. iterative solidification steps associated with each or any layer.

Figure 4:
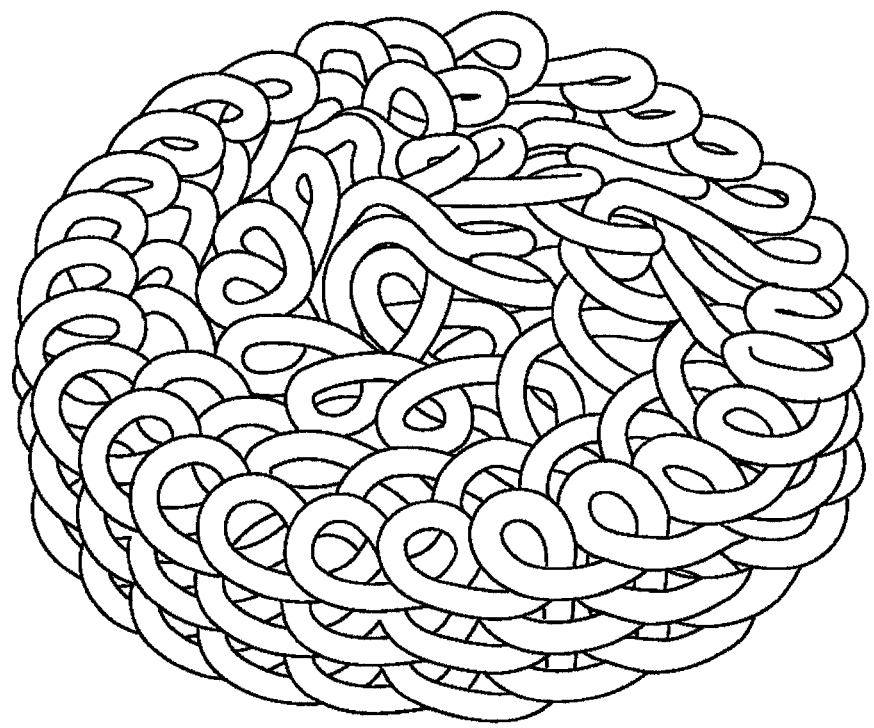
FIG. 4 is a picture of a porous three-dimensional (3D) article formed in accordance with the method.

The total number of layers required will depend, for example, on the size and shape of the porous 3D article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the porous 3D article is in a final solidified or cured state, the individual layers may not be identifiable. By way of example, a picture of a porous 3D article formed in accordance with one embodiment of the method is shown in FIG. 4.

In various embodiments, the 3D printer is selected from a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

The 3D printer may be independently selected during each printing step associated with the inventive method. Said differently, if desired, each printing step may utilize a different 3D printer. Different 3D printers may be utilized to impart different characteristics with respect to the layers, and different 3D printers may be particularly well suited for different types of compositions.

As noted above, the porous 3D article defines a plurality of voids. The voids may be external, i.e., defined by an exterior surface of the porous 3D article, and/or internal, i.e., defined by an interior volume of the porous 3D article. Typically, the voids are both external and internal.

Aspects of the voids are typically dictated by the desired end use application of the porous 3D article. For example, the porous 3D article may be referred to as a foam in view of the voids defined by the porous 3D article. The porous 3D article may be an open-celled foam and/or a closed-cell foam. The porous 3D article may be compressible and/or rigid.

The voids may be of any shape, size, configuration, and concentration, which properties may vary with respect to each individual void.

The voids may be defined or imparted via various techniques. For example, the voids may be imparted during the inventive method in connection with printing steps. The first composition, and/or any other compositions, may include and/or be exposed to a blowing agent, such as a chemical or physical blowing agent, prior to, during, and/or after printing each composition. As understood in the art, physical blowing agents may impart voids or pores associated with liquids or gasses of the physical blowing agents. In contrast, chemical blowing agents typically react with one or more components in a composition, with gas production being a byproduct that may impart voids.

Alternatively or in addition, the voids may be formed from printing itself. For example, when the first and second layers comprise the first and second filaments, the plurality of voids may be defined by at least the first and second filaments. The same is true for additional layers and additional filaments, i.e., the voids may be defined by the filaments of each individual layer and/or at the interface of adjacent layers. Alternatively or in addition, the voids may be defined by a single filament, e.g. the single filament itself may define a void, or may otherwise intersect or overlap with itself to present a void.

Moreover, the voids may be customized depending on end use application of the porous 3D article. When the voids are formed via printing, deposition patterns may be programmed into the 3D printer and utilized to selectively control the voids, including their location, shape and dimension. The voids may be concentrated within certain areas within the porous 3D article, i.e., may be heterogeneously distributed, or may be homogenously distributed within or throughout the porous 3D article.

In addition, voids may be formed subsequent to or contemporaneous with formation of the porous 3D article. For example, in certain embodiments, the method prepares a 3D article, and the method further comprises forming voids in the 3D article to give the porous 3D article. Alternatively, the method may prepare the porous 3D article, and the method may further comprise forming additional voids in the porous 3D article.

When the method comprises forming voids separate from those formed during printing, the voids may be formed via any suitable technique. Forming voids may be referred to as subtractive manufacturing process. Suitable subtractive manufacturing processes are generally contingent on the types of layers, the particular compositions utilized, etc.

For example, the voids may be formed mechanically, e.g. by inserting a rod or object into 3D article or porous 3D article to form voids. Alternatively or in addition, the voids may be formed by selectively etching portions of the 3D article, or the porous 3D article, to form voids. As understood in the art, selectively etching typically involves use of an etching material, which may be selectively applied or disposed on the 3D article, or the porous 3D article, to remove, or etch, portions thereof to leave voids. The etching material may be any suitable etching material contingent on the layers and their properties. For example, the etching material may be a solvent, which solubilizes and removes portions of the 3D article, or the porous 3D article.

Alternatively or in addition, the method may comprise exposing the layers, the 3D article, and/or the porous 3D article to the solidification condition to selectively solidify portions thereof to form voids. The selective application of the solidification condition also is typically based on the layers and the compositions utilized. For example, the selective application of the solidification condition may rely on use of a photomask and selective irradiation of a layer to selectively cure portions thereof, e.g. if the layer is radiation-curable. The uncured portions may then be removed, e.g. via etching, solvent, or other methods. Alternatively, the selective application of the solidification condition may rely on selective heat application, e.g. if the layer is heat-curable. Alternatively the selective application of radiation or heat may selectively depolymerize the exposed portions to be removed.

The average size of the voids may vary based on many factors, including desired end use applications of the porous 3D article, the compositions utilized, the technique utilized for forming the voids, etc.

The average sizes of the voids depend on the need for particular applications and may range from several Angstroms to several tens of centimeters. Void spaces larger than about a few micrometers in size can be directly printed or formed by physical and/or chemical blowing agents, which are selected based on the particular composition(s) utilized. Physical blowing agents can include, but are not limited to, air, nitrogen, carbon dioxide, and other gases. Chemical blowing agents can include, but are not limited to, silicone hydride compounds with water or silicon hydroxide compounds. Various techniques to incorporate voids of smaller sizes (micro and meso pores) may also be utilized, and include but are not limited to using siloxane cage structures, highly crosslinked siloxane or organic structures, or incorporating pre-formed materials containing pores of such sizes. Alternatively various portions in the three dimensional object can be removed by physical or chemical etching processes to form voids of different sizes.

The porous 3D article has myriad end use applications in view of the customization thereof, including with respect to the voids. For example, as noted above, the porous 3D article may be a compressible foam, or may be a rigid foam. The porous 3D article may be utilized in any application in which a foam is desired, and may be utilized in lieu of conventional polyurethane foams.

For example, foams have numerous end use applications, including cushion and support articles (e.g. furniture). Foams may also be utilized in noise, vibration and harshness (NVH) applications, e.g. in transportation applications (vehicles, trains, planes, ships, etc.). Further, foams may be utilized in or as airtight retaining gaskets architectural members or elements, refractory gaskets, sealing materials, O-rings, copier rolls, air dampening applications, acoustic applications, and other applications. In addition, the porous 3D article may also be utilized in health care applications, e.g. internal or external to a body of a mammal, such as a human, or in drug delivery. Foams may also be utilized in or as chemical reactors, water and soil remediation and purification techniques, light diffusion, armor, separation membranes, selective adsorption materials, and fire resistance applications.

The first and second compositions, and any subsequent or additional compositions utilized to print subsequent or additional layers, are independently selected and may be the same as or different from one another. As such, for purposes of clarity, reference below to "the composition" or "the compositions" is applicable to the first and/or second compositions, and any subsequent or additional compositions utilized to print subsequent or additional layers, and are not to be construed as requiring the compositions to be the same as one another.

In certain embodiments, at least one of the compositions, e.g. the first composition, the second composition, and/or any additional compositions, comprises: (a) a silicone composition, (b) a polymer, (c) a metal, (d) a slurry, or (e) combinations thereof.

In certain embodiments, at least one of the compositions comprises the silicone composition. Suitable silicone compositions may be independently selected from (a) hydrosilylation-curable silicone compositions; (b) condensation-curable silicone compositions; (c) thiol-ene reaction-curable silicone compositions; (d) free-radical-curable silicone compositions; and (e) ring-opening reaction curable silicone compositions. In these embodiments, the silicone compositions are generally curable such that exposure to the solidification condition may be referred to as exposure to a curing condition. As understood in the art, these silicone compositions may be cured via different curing conditions, such as exposure to moisture, exposure to heat, exposure to irradiation, etc. Moreover, these silicone compositions may be curable upon exposure to different types of curing conditions, e.g. both heat and irradiation, which may be utilized together or as only one. In addition, exposure to a curing condition may cure or initiate cure of different types of silicone compositions. For example, heat may be utilized to cure or initiate cure of condensation-curable silicone compositions, hydrosilylation-curable silicone compositions, and free radical-curable silicone compositions.

The silicone compositions may have the same cure mechanism upon application of the curing condition, but may still be independently selected from one another. For example, the first composition may comprise a condensation-curable silicone composition, and the second composition may also comprise a condensation-curable silicone composition, wherein the condensation-curable silicone compositions differ from one another, e.g. by components, relative amounts thereof, etc.

In certain embodiments, each of the silicone compositions utilized in the method cures via the same cure mechanism upon application of the curing condition. These embodiments easily allow for cure across the print line, if desired, as the components of in each of the silicone compositions may readily react with one another in view of having the same cure mechanism upon application of the curing condition. In these embodiments, each of the silicone compositions may still differ from one another in terms of the actual components utilized and relative amounts thereof, even though the cure mechanism is the same in each of the silicone compositions. In contrast, although there may be some cure across the print line when each of the layers cures via a different mechanism (e.g. hydrosilylation versus condensation), components in these layers may not be able to react with one another upon application of the curing condition, which may be desirable in other applications.

In certain embodiments, at least one of the silicone compositions comprises a hydrosilylation-curable silicone composition. In these embodiments, the hydrosilylation-curable silicone composition typically comprises: (A) an organopolysiloxane having an average of at least two silicon-bonded alkenyl groups or silicon-bonded hydrogen atoms per molecule; (B) an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane (A); and (C) a hydrosilylation catalyst. When the organopolysiloxane (A) includes silicon-bonded alkenyl groups, the organosilicon compound (B) includes at least two silicon-bonded hydrogen atoms per molecule, and when the organopolysiloxane (A) includes silicon-bonded hydrogen atoms, the organosilicon compound (B) includes at least two silicon-bonded alkenyl groups per molecule. The organosilicon compound (B) may be referred to as a cross-linker or cross-linking agent.

The organopolysiloxane (A) and the organosilicon compound (B) may independently be linear, branched, cyclic, or resinous. In particular, the organopolysiloxane (A) and the organosilicon compound (B) may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

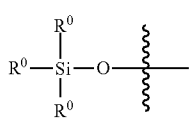

[M]

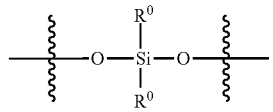

[D]

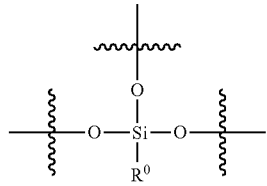

[T]

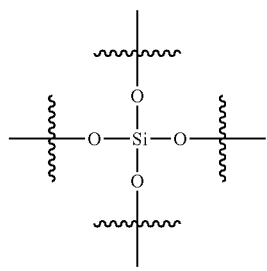

[Q]

In these structures/formulae, each $R^0$ may be any hydrocarbon, aromatic, aliphatic, alkyl, alkenyl, or alkynl group.

The particular organopolysiloxane (A) and organosilicon compound (B) may be selected based on desired properties of the porous 3D article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, one of the organopolysiloxane (A) and the organosilicon compound (B) comprises a silicone resin, which typically comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting porous 3D article have increased rigidity.

Alternatively, in other embodiments, the organopolysiloxane (A) and/or the organosilicon compound (B) is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting porous 3D article are elastomeric.

The silicon-bonded alkenyl groups and silicon-bonded hydrogen atoms of the organopolysiloxane (A) and the organosilicon compound (B), respectively, may independently be pendent, terminal, or in both positions.

In a specific embodiment, the organopolysiloxane (A) has the general formula:

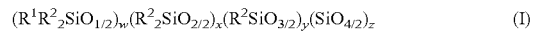

$$(R^1R^2{}_2SiO_{1/2})_w(R^2{}_2SiO_{2/2})_x(R^2SiO_{3/2})_y(SiO_{4/2})_z \quad (I)$$

wherein each $R^1$ is an independently selected hydrocarbyl group, which may be substituted or unsubstituted, and each $R^2$ is independently selected from $R^1$ and an alkenyl group, with the proviso that at least two of $R^2$ are alkenyl groups, and w, x, y, and z are mole fractions such that w+x+y+z=1. As understood in the art, for linear organopolysiloxanes, subscripts y and z are generally 0, whereas for resins, subscripts y and/or z>0. Various alternative embodiments are described below with reference to w, x, y and z. In these embodiments, the subscript w may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

In certain embodiments, each $R^1$ is a $C_1$ to $C_{10}$ hydrocarbyl group, which may be substituted or unsubstituted, and which may include heteroatoms within the hydrocarbyl group, such as oxygen, nitrogen, sulfur, etc. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different within the organopolysiloxane (A), typically have from 2 to 10 carbon atoms, alternatively from 2 to 6 carbon atoms, and are exemplified by, for example, vinyl, allyl, butenyl, hexenyl, and octenyl.

In these embodiments, the organosilicon compound (B) may be further defined as an organohydrogensilane, an organopolysiloxane an organohydrogensiloxane, or a combination thereof. The structure of the organosilicon compound (B) can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms. The organohydrogensilane can be a monosilane, disilane, trisilane, or polysilane.

Hydrosilylation catalyst (C) includes at least one hydrosilylation catalyst that promotes the reaction between the organopolysiloxane (A) and the organosilicon compound (B). The hydrosilylation catalyst (C) can be any of the well-known hydrosilylation catalysts comprising a platinum group metal (i.e., platinum, rhodium, ruthenium, palladium, osmium and iridium) or a compound containing a platinum group metal. Typically, the platinum group metal is platinum, based on its high activity in hydrosilylation reactions.

Specific hydrosilylation catalysts suitable for (C) include the complexes of chloroplatinic acid and certain vinyl-containing organosiloxanes disclosed by Willing in U.S. Pat. No. 3,419,593, the portions of which address hydrosilylation catalysts are hereby incorporated by reference. A catalyst of this type is the reaction product of chloroplatinic acid and 1,3-diethenyl-1,1,3,3-tetramethyldisiloxane.

The hydrosilylation catalyst (C) can also be a supported hydrosilylation catalyst comprising a solid support having a platinum group metal on the surface thereof. A supported catalyst can be conveniently separated from organopolysiloxanes, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

In addition or alternatively, the hydrosilylation catalyst (C) can also be a microencapsulated platinum group metal-containing catalyst comprising a platinum group metal encapsulated in a thermoplastic resin. Hydrosilylation-curable silicone compositions including microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

The hydrosilylation catalyst (C) may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

Specific examples of photoactivatable hydrosilylation catalysts include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p-CN—C_6H_4NNNOC_6H_{11}]_4$, $Pt[p-H_3COC_6H_4NNNOC_6H_{11}]_4$, $Pt[p-CH_3(CH_2)_x—C_6H_4NNNOCH_3]_4$, 1,5-cyclooctadiene.$Pt[p-CN—C_6H_4NNNOC_6H_{11}]_2$, 1,5-cyclooctadiene.$Pt[p-CH_3O—C_6H_4NNNOCH_3]_2$, $[(C_6H_5)_3P]_3Rh[p-CN—C_6H_4NNNOC_6H_{11}]$, and $Pd[p-CH_3(CH_2)C_6H_4NNNOCH_3]_2$, where x is 1, 3, 5, 11, or 17; (η-diolefin)(σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl)bis-(4-dimethylaminophenyl)platinum, ($η^4$-1,5-cyclooctadienyl)bis-(4-acetylphenyl)platinum, and ($η^4$-1,5-cyclooctadienyl)bis-(4-trifluormethylphenyl)platinum.

Typically, the photoactivatable hydrosilylation catalyst is a Pt(II) β-diketonate complex and more typically the catalyst is platinum(II) bis(2,4-pentanedioate). The hydrosilylation catalyst (C) can be a single photoactivatable hydrosilylation catalyst or a mixture comprising two or more different photoactivatable hydrosilylation catalysts.

The concentration of the hydrosilylation catalyst (C) is sufficient to catalyze the addition reaction between the organopolysiloxane (A) and the organosilicon compound (B). In certain embodiments, the concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the organopolysiloxane (A) and the organosilicon compound (B).

The hydrosilylation-curable silicone composition may be a two-part composition where the organopolysiloxane (A) and organosilicon compound (B) are in separate parts. In these embodiments, the hydrosilylation catalyst (C) may be present along with either or both of the organopolysiloxane (A) and organosilicon compound (B). Alternatively still, the hydrosilylation catalyst (C) may be separate from the organopolysiloxane (A) and organosilicon compound (B) in a third part such that the hydrosilylation reaction-curable silicone composition is a three-part composition.

In one specific embodiment the hydrosilylation-curable silicone composition comprises $ViMe_2(Me_2SiO)_{128}SiMe_2Vi$ as the organopolysiloxane (A), $Me_3SiO(Me_2SiO)_{14}(MeHSiO)_{16}SiMe_3$ as the organosilicon compound (B) and a complex of platinum with divinyltretramethyldisiloxane as (C) such that platinum is present in a concentration of 5 ppm based on (A), (B) and (C).

Solidification conditions for such hydrosilylation-curable silicone compositions may vary. For example, hydrosilylation-curable silicone composition may be solidified or cured upon exposure to irradiation and/or heat. One of skill in the art understands how selection of the hydrosilylation catalyst (C) impacts techniques for solidification and curing. In particular, photoactivatable hydrosilylation catalysts are typically utilized when curing via irradiation is desired.

In these or other embodiments, at least one of the silicone compositions comprises a condensation-curable silicone composition. In these embodiments, the condensation-curable silicone composition typically comprises (A') an organopolysiloxane having an average of at least two silicon-bonded hydroxyl or hydrolysable groups per molecule; optionally (B') an organosilicon compound having an average of at least two silicon-bonded hydrogen atoms, hydroxyl groups, or hydrolysable groups per molecule; and (C') a condensation catalyst. Although any parameter or condition may be selectively controlled during the inventive method or any individual step thereof, relative humidity and/or moisture content of ambient conditions may be selectively controlled to further impact a cure rate of condensation-curable silicone compositions.

The organopolysiloxane (A') and the organosilicon compound (B') may independently be linear, branched, cyclic, or resinous. In particular, the organopolysiloxane (A') and the organosilicon compound (B') may comprise any combination of M, D, T, and Q units, as with the organopolysiloxane (A) and the organosilicon compound (B') disclosed above.

The particular organopolysiloxane (A') and organosilicon compound (B') may be selected based on desired properties of the porous 3D article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, one of the organopolysiloxane (A') and the organosilicon compound (B') comprises a silicone resin, which typically comprises T and/or Q units in combination with M and/or D units. When the organopolysiloxane (A') and/or organosilicon compound (B') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the condensation-curable silicone composition comprises a resin, the layer(s) and resulting porous 3D article have increased rigidity.

Alternatively, in other embodiments, the organopolysiloxane (A') and/or the organosilicon compound (B') is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting porous 3D article are elastomeric.

The silicon-bonded hydroxyl groups and silicon-bonded hydrogen atoms, hydroxyl groups, or hydrolysable groups of the organopolysiloxane (A') and the organosilicon compound (B'), respectively, may independently be pendent, terminal, or in both positions.

As known in the art, silicon-bonded hydroxyl groups result from hydrolyzing silicon-bonded hydrolysable groups. These silicon-bonded hydroxyl groups may condense to form siloxane bonds with water as a byproduct.

Examples of hydrolysable groups include the following silicon-bonded groups: H, a halide group, an alkoxy group, an alkylamino group, a carboxy group, an alkyliminoxy group, an alkenyloxy group, or an N-alkylamido group. Alkylamino groups may be cyclic amino groups.

In a specific embodiment, the organopolysiloxane (A') has the general formula:

$$(R^1R^3{}_2SiO_{1/2})_{w'}(R^3{}_2SiO_{2/2})_{x'}(R^3SiO_{3/2})_{y'}(SiO_{4/2})_{z'}, \qquad (II)$$

wherein each $R^1$ is defined above and each $R^3$ is independently selected from $R^1$ and a hydroxyl group, a hydrolysable group, or combinations thereof with the proviso that at least two of $R^3$ are hydroxyl groups, hydrolysable groups, or combinations thereof, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x' typically has a value of from 0 to 0.9, alternatively from 0 to 0.45, alternatively from 0 to 0.25. The subscript y' typically has a value of from 0 to 0.99, alternatively from 0.25 to 0.8, alternatively from 0.5 to 0.8. The subscript z' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

As set forth above, the condensation-curable silicone composition further comprises the organosilicon compound (B'). The organosilicon compound (B') may be linear, branched, cyclic, or resinous. In one embodiment, the organosilicon compound (B') has the formula $R^1_q SiX_{4-q}$, wherein $R^1$ is defined above, X is a hydrolysable group, and q is 0 or 1.

Specific examples of organosilicon compounds (B') include alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The organosilicon compound (B') can be a single silane or a mixture of two or more different silanes, each as described above. Also, methods of preparing tri- and tetra-functional silanes are well known in the art; many of these silanes are commercially available.

When present, the concentration of the organosilicon compound (B') in the condensation-curable silicone composition is sufficient to cure (cross-link) the organopolysiloxane (A'). The particular amount of the organosilicon compound (B') utilized depends on the desired extent of cure, which generally increases as the ratio of the number of moles of silicon-bonded hydrolysable groups in the organosilicon compound (B') to the number of moles of silicon-bonded hydroxy groups in the organopolysiloxane (A') increases. The optimum amount of the organosilicon compound (B') can be readily determined by routine experimentation.

The condensation catalyst (C') can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst ($C^1$) can be selected from tin(II) and tin(IV) compounds such as tin dilaurate, tin dioctoate, and tetrabutyl tin; and titanium compounds such as titanium tetrabutoxide.

When present, the concentration of the condensation catalyst (C') is typically from 0.1 to 10% (w/w), alternatively from 0.5 to 5% (w/w), alternatively from 1 to 3% (w/w), based on the total weight of the organopolysiloxane (A') in the condensation-curable silicone composition.

When the condensation-curable silicone composition includes the condensation catalyst (C'), the condensation-curable silicone composition is typically a two-part composition where the organopolysiloxane (A') and condensation catalyst (C') are in separate parts. In this embodiment, the organosilicon compound (B') is typically present along with the condensation catalyst (C'). Alternatively still, the condensation-curable silicone composition may be a three-part composition, where the organopolysiloxane (A'), the organosilicon compound (B') and condensation catalyst (C') are in separate parts.

Solidification conditions for such condensation-curable silicone compositions may vary. For example, condensation-curable silicone composition may be solidified or cured upon exposure to ambient conditions, a moisturized atmosphere, and/or heat, although heat is commonly utilized to accelerate solidification and curing.

In these or other embodiments, at least one of the silicone compositions comprises a free radical-curable silicone composition. In one embodiment, the free radical-curable silicone composition comprises (A") an organopolysiloxane having an average of at least two silicon-bonded unsaturated groups and (C") a free radical initiator.

The organopolysiloxane (A") may be linear, branched, cyclic, or resinous. In particular, the organopolysiloxane (A") may comprise any combination of M, D, T, and Q units, as with the organopolysiloxane (A') and the organosilicon compound (B') disclosed above.

The particular organopolysiloxane (A") may be selected based on desired properties of the porous 3D article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, the organopolysiloxane (A") comprises a silicone resin, which typically comprises T and/or Q units in combination with M and/or D units. When the organopolysiloxane (A") comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting porous 3D article have increased rigidity.

Alternatively, in other embodiments, the organopolysiloxane (A") comprises repeating D units. Such organopolysiloxanes are substantially linear but may include some branching attributable to T and/or Q units. Alternatively, such organopolysiloxanes are linear. In these embodiments, the layer(s) and resulting porous 3D article are elastomeric.

The silicon-bonded unsaturated groups of the organopolysiloxane (A") may be pendent, terminal, or in both positions. The silicon-bonded unsaturated groups may include ethylenic unsaturation in the form of double bonds and/or triple bonds. Exemplary examples of silicon-bonded unsaturated groups include silicon-bonded alkenyl groups and silicon-bonded alkynyl groups.

In a specific embodiment, the organopolysiloxane (A") has the general formula:

$$(R^1R^4_2SiO_{1/2})_{w''}(R^4_2SiO_{2/2})_{x''}(R^4SiO_{3/2})_{y''}(SiO_{4/2})_{z''} \qquad (III)$$

wherein each $R^1$ is defined above and each $R^4$ is independently selected from $R^1$ and an unsaturated group, with the proviso that at least two of $R^4$ are unsaturated groups, and w", x", y", and z" are mole fractions such that w"+x"+y"+z"=1. As understood in the art, for linear organopolysiloxanes, subscripts y" and z" are generally 0, whereas for resins, subscripts y" and/or z">0. Various alternative embodiments are described below with reference to w", x", y" and z". In these embodiments, the subscript w" may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x" typically has a value of from 0 to 0.9, alternatively from 0 to 0.45, alternatively from 0 to 0.25. The subscript y" typically has a value of from 0 to 0.99, alternatively from 0.25 to 0.8, alternatively from 0.5 to 0.8. The subscript z" typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The unsaturated groups represented by $R^4$ may be the same or different and are independently selected from alkenyl and alkynyl groups. The alkenyl groups represented by $R^4$, which may be the same or different, are as defined and exemplified in the description of $R^2$ above. The alkynyl groups represented by $R^4$, which may be the same or different, typically have from 2 to about 10 carbon atoms, alternatively from 2 to 8 carbon atoms, and are exemplified by, but are not limited to, ethynyl, propynyl, butynyl, hexynyl, and octynyl.

The free radical-curable silicone composition can further comprise an unsaturated compound selected from (i) at least one organosilicon compound having at least one silicon-bonded alkenyl group per molecule, (ii) at least one organic compound having at least one aliphatic carbon-carbon double bond per molecule, (iii) at least one organosilicon compound having at least one silicon-bonded acryloyl group per molecule; (iv) at least one organic compound having at least one acryloyl group per molecule; and (v) mixtures comprising (i), (ii), (iii) and (iv). The unsaturated compound can have a linear, branched, or cyclic structure.

The organosilicon compound (i) can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl group(s) can be located at terminal, pendant, or at both terminal and pendant positions.

Specific examples of organosilanes include, but are not limited to, silanes having the following formulae:

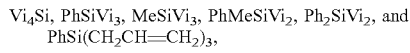

wherein Me is methyl, Ph is phenyl, and Vi is vinyl.

Specific examples of organosiloxanes include, but are not limited to, siloxanes having the following formulae:

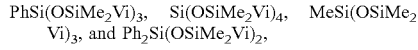

wherein Me is methyl, Vi is vinyl, and Ph is phenyl.

The organic compound can be any organic compound containing at least one aliphatic carbon-carbon double bond per molecule, provided the compound does not prevent the organopolysiloxane (A") from curing to form a silicone resin film. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C=O, —CHO, —CO$_2$—, —C≡N, —NO$_2$, >C=C<, —C≡C—, —F, —Cl, —Br, and —I. The suitability of a particular unsaturated organic compound for use in the free-radical curable silicone composition of the present invention can be readily determined by routine experimentation.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The free radical initiator (C") is a compound that produces a free radical, and is utilized to initiate polymerization of the organopolysiloxane (A"). Typically, the free radical initiator (C") produces a free radical via dissociation caused by irradiation, heat, and/or reduction by a reducing agent. The free radical initiator (C") may be an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aryl peroxides such as t-butyl perbenzoate, t-butyl peracetate, and t-butyl peroctoate.

The organic peroxide (C") can be a single peroxide or a mixture comprising two or more different organic peroxides. The concentration of the organic peroxide is typically from 0.1 to 5% (w/w), alternatively from 0.2 to 2% (w/w), based on the weight of the organopolysiloxane (A").

The free radical-curable silicone composition may be a two-part composition where the organopolysiloxane (A") and the free radical initiator (C") are in separate parts.

In other embodiments, at least one of the silicone compositions comprises a ring opening reaction-curable silicone composition. In various embodiments, the ring opening reaction-curable silicone composition comprises (A''') an organopolysiloxane having an average of at least two epoxy-substituted groups per molecule and (C''') a curing agent. However, the ring opening reaction-curable silicone composition is not limited specifically to epoxy-functional organopolysiloxanes. Other examples of ring opening reaction-curable silicone compositions include those comprising silacyclobutane and/or benzocyclobutene.

The organopolysiloxane (A''') may be linear, branched, cyclic, or resinous. In particular, the organopolysiloxane (A''') may comprise any combination of M, D, T, and Q units, as with the organopolysiloxane (A') and the organosilicon compound (B') disclosed above.

The particular organopolysiloxane (A''') may be selected based on desired properties of the porous 3D article and layers during the inventive method. For example, it may be desirable for the layers to be in the form of an elastomer, a gel, a resin, etc., and selecting the components of the silicone composition allows one of skill in the art to achieve a range of desirable properties.

For example, in certain embodiments, the organopolysiloxane (A''') comprises a silicone resin, which typically comprises T and/or Q units in combination with M and/or D units. When the organopolysiloxane (A''') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting porous 3D article have increased rigidity.

Alternatively, in other embodiments, the organopolysiloxane (A''') comprises repeating D units. Such organopolysiloxanes are substantially linear but may include some branching attributable to T and/or Q units. Alternatively, such organopolysiloxanes are linear. In these embodiments, the layer(s) and resulting porous 3D article are elastomeric.

The epoxy-substituted groups of the organopolysiloxane (A''') may be pendent, terminal, or in both positions. "Epoxy-substituted groups" are generally monovalent organic groups in which an oxygen atom, the epoxy substituent, is directly attached to two adjacent carbon atoms of a carbon chain or ring system. Examples of epoxy-substituted organic groups include, but are not limited to, 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3 epoxycylopentyl)propyl.

In a specific embodiment, the organopolysiloxane (A''') has the general formula:

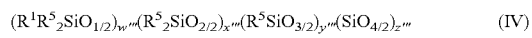

$$(R^1R^5{}_2SiO_{1/2})_{w'''}(R^5{}_2SiO_{2/2})_{x'''}(R^5SiO_{3/2})_{y'''}(SiO_{4/2})_{z'''} \quad (IV)$$

wherein each $R^1$ is defined above and each $R^5$ is independently selected from $R^1$ and an epoxy-substituted group, with the proviso that at least two of $R^5$ are epoxy-substituted groups, and w''', x''', y''', and z''' are mole fractions such that w'''+x'''+y'''+z'''=1. As understood in the art, for linear organopolysiloxanes, subscripts y''' and z''' are generally 0, whereas for resins, subscripts y''' and/or z'''>0. Various alternative embodiments are described below with reference to w''', x''', y''' and z'''. In these embodiments, the subscript w''' may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99, The subscript x''' typically has a value of from 0 to 0.9, alternatively from 0 to 0.45, alternatively from 0 to 0.25. The subscript y''' typically has a value of from 0 to 0.99, alternatively from 0.25 to 0.8, alternatively from 0.5 to 0.8. The subscript z''' typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

The curing agent (C''') can be any curing agent suitable for curing the organopolysiloxane (A'''). Examples of curing agents (C''') suitable for that purpose include phenolic compounds, carboxylic acid compounds, acid anhydrides, amine compounds, compounds containing alkoxy groups, compounds containing hydroxyl groups, or mixtures thereof or partial reaction products thereof. More specifically, examples of curing agents (C''') include tertiary amine compounds, such as imidazole; quaternary amine compounds; phosphorus compounds, such as phosphine; aluminum compounds, such as organic aluminum compounds; and zirconium compounds, such as organic zirconium compounds. Furthermore, either a curing agent or curing catalyst or a combination of a curing agent and a curing catalyst can be used as the curing agent (C'''). The curing agent (C''') can also be a photoacid or photoacid generating compound.

The ratio of the curing agent (C''') to the organopolysiloxane (A''') is not limited. In certain embodiments, this ratio is from 0.1-500 parts by weight of the curing agent (C''') per 100 parts by weight of the organopolysiloxane (A''').

In other embodiments, at least one of the silicone compositions comprises a thiol-ene curable silicone composition. In these embodiments, the thiol-ene curable silicone composition typically comprises: (A'''') an organopolysiloxane having an average of at least two silicon-bonded alkenyl groups or silicon-bonded mercapto-alkyl groups per molecule; (B'''') an organosilicon compound having an average of at least two silicon-bonded mercapto-alkyl groups or silicon-bonded alkenyl groups per molecule capable of reacting with the silicon-bonded alkenyl groups or silicon-bonded mercapto-alkyl groups in the organopolysiloxane (A''''); (C'''') a catalyst; and (D'''') an optional organic compound containing two or more mercapto groups. When the organopolysiloxane (A'''') includes silicon-bonded alkenyl groups, the organosilicon compound (B'''') and/or the organic compound (D'''') include at least two mercapto groups per molecule bonded to the silicon and/or in the organic compound, and when the organopolysiloxane (A'''') includes silicon-bonded mercapto groups, the organosilicon compound (B'''') includes at least two silicon-bonded alkenyl groups per molecule. The organosilicon compound (B'''') and/or the organic compound (D'''') may be referred to as a cross-linker or cross-linking agent.

The catalyst (C'''') can be any catalyst suitable for catalyzing a reaction between the organopolysiloxane (A'''') and the organosilicon compound (B'''') and/or the organic compound (D''''). Typically, the catalyst (C'''') is selected from: i) a free radical catalyst; ii) a nucleophilic reagent; and iii) a combination of i) and ii). Suitable free radical catalysts for use as the catalyst (C'''') include photo-activated free radical catalysts, heat-activated free radical catalysts, room temperature free radical catalysts such as redox catalysts and alkylborane catalysts, and combinations thereof. Suitable nucleophilic reagents for use as the catalyst (C'''') include amines, phosphines, and combinations thereof.

In still other embodiments, at least one of the silicone compositions comprises a silicon hydride-silanol reaction curable silicone composition. In these embodiments, the silicon hydride-silanol reaction curable silicone composition typically comprises: (A''''') an organopolysiloxane having an average of at least two silicon-bonded hydrogen atoms or at least two silicone bonded hydroxyl groups per molecule; (B''''') an organosilicon compound having an average of at least two silicon-bonded hydroxyl groups or at least two silicon bonded hydrogen atoms per molecule capable of reacting with the silicon-bonded hydrogen atoms or silicon-bonded hydroxyl groups in the organopolysiloxane (A'''''); (C''''') a catalyst; and (D''''') an optional active hydrogen containing compound. When the organopolysiloxane (A''''') includes silicon-bonded hydrogen atoms, the organosilicon compound (B''''') and/or the organic compound (D''''') include at least two hydroxyl groups per molecule bonded to the silicon and/or in the active hydrogen containing compound, and when the organopolysiloxane (A''''') includes silicon-bonded hydroxyl groups, the organosilicon compound (B''''') includes at least two silicon-bonded hydrogen atoms per molecule. The organosilicon compound (B''''') and/or the organic compound (D''''') may be referred to as a cross-linker or cross-linking agent.

Typically, the catalyst (C''''') is selected from: i) a Group X metal-containing catalyst such as platinum; ii) a base such as metal hydroxide, amine, or phosphine; and iii) combinations thereof.

Solidification conditions for such silicon hydride-silanol condensation-curable silicone compositions may vary. Typically, such compositions are mixed as a two-part system and subsequently cured under ambient conditions. However, heat may also be utilized during solidification.

Any of the silicone compositions may optionally and independently further comprise additional ingredients or components, especially if the ingredient or component does not prevent the organosiloxane of the composition from curing. Examples of additional ingredients include, but are not limited to, fillers; inhibitors; adhesion promoters; dyes; pigments; anti-oxidants; carrier vehicles; heat stabilizers; flame retardants; thixotroping agents; flow control additives; fillers, including extending and reinforcing fillers; and cross-linking agents. In various embodiments, the composition further comprises ceramic powder. The amount of ceramic powder can vary and may depend on the 3D printing process being utilized.

One or more of the additives can be present as any suitable wt. % of the particular silicone composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the silicone composition.

In certain embodiments, the silicone compositions are shear thinning. Compositions with shear thinning properties may be referred to as psuedoplastics. As understood in the art, compositions with shear thinning properties are characterized by having a viscosity which decreases upon an increased rate of shear strain. Said differently, viscosity and shear strain are inversely proportional for shear thinning compositions. When the silicone compositions are shear thinning, the silicone compositions are particularly well suited for printing, especially when a nozzle or other dispense mechanism is utilized. A specific example of a shear-thing silicone composition is XIAMETER® 9200 LSR, commercially available from Dow Corning Corporation of Midland, Mich.

In certain embodiments, at least one of the compositions, e.g. the first composition, the second composition, and/or any additional compositions, comprises the polymer. The polymer may be any of the silicone polymers described above. Alternatively or in addition, the polymer may comprise an organic polymer or resin. Alternatively still, the polymer may comprise an organic-silicone hybrid polymer. The polymer may be disposed in a vehicle or solvent.

The polymer may be a thermosetting and/or thermoplastic polymer or resin. Examples of suitable thermosetting and/or thermoplastic resins include epoxy, polyester, phenol, polyamide, polyimide, polyvinyl, polyvinyl ester (i.e., vinylester), and polyurethane resins, as well as modifications, and combinations thereof. Additionally, elastomers and/or rubbers can be added to or compounded with the uncured thermosetting and/or thermoplastic resin to improve certain properties such as impact strength.

Other specific examples of suitable thermosetting and/or thermoplastic resins include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

In certain embodiments, at least one of the compositions, e.g. the first composition, the second composition, and/or any additional compositions, comprises the metal. The metal may be any of metal or alloy, and may be a liquid or slurry. Typically, a low-melting metal is used such that the at least one composition comprising the metal and/or the metal itself can be melted in an extruder and extrusion printed and/or deposited accordingly. In some embodiments, porous sections comprising the metal are formed during the printing process, such that coiling regions are produced as described above. Alternatively, sections comprising the metal which are not porous are formed during the printing process and may be incorporated as a section in a porous body to add functionality (e.g. structural support, section separation, etc.). When the metal is a liquid, an appropriate solidification condition and/or mechanism is utilized. Such solidification conditions include sufficient cooling and forming a solid alloy with another material already presented on the substrate the liquid metal is being deposited onto. In some embodiments, the metal is a slurry of metal particles in a carrier such as water or a non-oxidizing solvent. The slurry can be printed into a porous section by itself, or as a nonporous section of an otherwise porous body. The printed section formed from slurry can be further processed, such as via laser melting, etching, and/or sintering.

In certain embodiments, at least one of the compositions, e.g. the first composition, the second composition, and/or any additional compositions, comprises a slurry. In one embodiment, the slurry is a ceramic slurry. The ceramic slurry may be carried by water, and may be combined with one or more binders such as a polymer. Typically, the ceramic slurry can be dried/solidified via evaporation of the carrier (e.g. water) and/or drying. The dried/solidified ceramic slurry can be further processed or consolidated by heating, such as via convection, heat conduction, or radiation. Ceramics that may be used to form the ceramic slurry include oxides of various metals, carbides, nitrides, borides, silicides, and combinations and/or modifications thereof. In some embodiments, as mentioned above, the slurry is a metal slurry. In these or other embodiments, the slurry comprises, alternatively is a polymer slurry. The polymer slurry is typically a solution or dispersion of a polymer in water or an organic solvent. The polymer slurry may comprise any suitable polymer, and typically comprises a viscosity for printing at ambient or elevated temperatures.

Any of the compositions described above may be a single part or a multi-part composition, as described above with reference to certain silicone compositions. Certain compositions are highly reactive such that multi-part compositions prevent premature mixing and curing of the components. The multi-part composition may be, for example, a two-part system, a three-part system, etc. contingent on the selection of the composition and the components thereof. Any component of the composition may be separate from and individually controlled with respect to the remaining components.

In certain embodiments, when the compositions are multi-part compositions, the separate parts of the multi-part composition may be mixed in a dispense printing nozzle, e.g. a dual dispense printing nozzle, prior to and/or during printing. Alternatively, the separate parts may be combined immediately prior to printing. Alternatively still, the separate parts may be combined after exiting the nozzle, e.g. by crossing printing streams or by mixing the separate parts as the layers are formed.

The compositions can be of various viscosities. In certain embodiments, the composition has a viscosity less than 500, less than 250, or less than 100, centistokes at 25° C., alternatively a viscosity of from 1 to 1,000,000 centistokes at 25° C., alternatively from 1 to 100,000 centistokes at 25° C., alternatively from 1 to 10,000 centistokes at 25° C. Viscosity of each composition can be changed by altering the amounts and/or molecular weight of one or more components thereof. Viscosity may be adjusted to match components of the nozzle or apparatus, particularly any nozzle or dispensing mechanism, to control heat, speed or other parameters associated with printing. As readily understood in the art, kinematic viscosity may be measured in accordance with ASTM D-445 (2011), entitled "Standard Test Method for Kinematic Viscosity of Transparent and Opaque Liquids (and Calculation of Dynamic Viscosity)."

As will be appreciated from the disclosure herein, the compositions may be in any form suitable for printing and, subsequently, for solidification after printing. Accordingly, each composition utilized may independently be in a liquid, solid, or semi-solid form. For example, each composition may be utilized as a liquid suitable for forming streams and/or droplets, a powder, and/or a heat-meltable solid, depending on the particular composition and printing conditions selected and as described above.

When the solidification condition comprising heating, exposure to the solidification condition typically comprises heating the layer(s) at an elevated temperature for a period of time. The elevated temperature and the period of time may vary based on numerous factors, including the selection of the particular silicone composition, a desired cross-link density of the at least partially solidified layer, dimensions of the layer(s), etc. In certain embodiments, the elevated temperature is from above room temperature to 500, alternatively from 30 to 450, alternatively from 30 to 350, alternatively from 30 to 300, alternatively from 30 to 250, alternatively from 40 to 200, alternatively from 50 to 150, ° C. In these or other embodiments, the period of time is from 0.001 to 600, alternatively from 0.04 to 60, alternatively from 0.1 to 10, alternatively from 0.1 to 5, alternatively from 0.2 to 2, minutes.

Any source of heat may be utilized for exposing the layer(s) to heat. For example, the source of heat may be a convection oven, rapid thermal processing, a hot bath, a hot plate, or radiant heat. Further, if desired, a heat mask or other similar device may be utilized for selective curing of the layer(s), as introduced above.

In certain embodiments, heating is selected from (i) conductive heating via a substrate on which the layer is printed; (ii) heating the silicone composition via the 3D printer or a component thereof; (iii) infrared heating; (iv) radio frequency or micro-wave heating; (v) a heating bath with a heat transfer fluid; (vi) heating from an exothermic reaction of the silicone composition; (vii) magnetic heating; (viii) oscillating electric field heating; and (ix) combinations thereof. When the method includes more than one heating step, e.g. in connection with each individual layer, each heating step is independently selected.

Such heating techniques are known in the art. For example, the heat transfer fluid is generally an inert fluid, e.g. water, which may surround and contact the layer as the silicone composition is printed, thus initiating at least partial curing thereof. With respect to (ii) heating the silicone composition via the 3D printer or a component thereof, any portion of the silicone composition may be heated and combined with the remaining portion, or the silicone composition may be heated in its entirety. For example, a portion (e.g. one component) of the silicone composition may be heated, and, once combined with the remaining portion, the silicone composition initiates curing. The combination of the heated portion and remaining portion may be before, during, and/or after the step of printing the silicone composition. The components may be separately printed.

Alternatively or in addition, the solidification condition may be exposure to irradiation.

The energy source independently utilized for the irradiation may emit various wavelengths across the electromagnetic spectrum. In various embodiments, the energy source emits at least one of ultraviolet (UV) radiation, microwave radiation, radiofrequency radiation, infrared (IR) radiation, visible light, X-rays, gamma rays, oscillating electric field, or electron beams (e-beam). One or more energy sources may be utilized.

In certain embodiments, the energy source emits at least UV radiation. In physics, UV radiation is traditionally divided into four regions: near (400-300 nm), middle (300-200 nm), far (200-100 nm), and extreme (below 100 nm). In biology, three conventional divisions have been observed for UV radiation: near (400-315 nm); actinic (315-200 nm); and vacuum (less than 200 nm). In specific embodiments, the energy source emits UV radiation, alternatively actinic radiation. The terms of UVA, UVB, and UVC are also common in industry to describe the different wavelength ranges of UV radiation.

In certain embodiments, the radiation utilized to cure the layer(s) may have wavelengths outside of the UV range. For example, visible light having a wavelength of from 400 nm to 800 nm can be used. As another example, IR radiation having a wavelength beyond 800 nm can be used.

In other embodiments, e-beam can be utilized to cure the layer(s). In these embodiments, the accelerating voltage can be from about 0.1 to about 10 MeV, the vacuum can be from about 10 to about $10^{-3}$ Pa, the electron current can be from about 0.0001 to about 1 ampere, and the power can vary from about 0.1 watt to about 1 kilowatt. The dose is typically from about 100 micro-coulomb/cm$^2$ to about 100 coulomb/cm$^2$, alternatively from about 1 to about 10 coulombs/cm$^2$. Depending on the voltage, the time of exposure is typically from about 10 seconds to 1 hour; however, shorter or longer exposure times may also be utilized.

Embodiment 1 relates to a method of forming a porous three-dimensional (3D) article with an apparatus having a nozzle, the method comprising:

I) printing a first composition on a substrate with the nozzle of the apparatus to form at least one first filament comprising the first composition;

wherein the substrate and the nozzle are spaced a distance from one another and at least one of the substrate and the nozzle is moved at a speed relative to the other during step I);

II) selectively controlling the distance and/or the speed such that the at least one first filament coils on the substrate to give a first layer on the substrate, the first layer comprising a coiled filament, wherein the coiled filament has a width and a period length;

optionally, repeating steps I) and II) with independently selected composition(s) for any additional layer(s); and III) exposing the layer(s) to a solidification condition;

wherein the porous three-dimensional (3D) article defines a plurality of voids.

Embodiment 2 relates to the method of Embodiment 1, further comprising:

IV) printing a second composition with the nozzle of the apparatus to form at least one second filament comprising the second composition on the first layer; wherein the first layer and the nozzle are spaced a distance from one another and at least one of the substrate and the nozzle is moved at a speed relative to the other during step IV);

V) selectively controlling the distance and/or the speed such that the at least one second filament coils on the first layer to give a second layer on the first layer, the second layer comprising a second coiled filament, wherein the second coiled filament has a width and a period length.

Embodiment 3 relates to the method of Embodiment 2, wherein: (i) the plurality of voids are defined by at least the first and second filaments; (ii) the first and second filaments are the same and continuous with one another; (iii) at least the first and second filaments include the plurality of voids; (iv) the first and/or second filaments are hollow; or (v) any combination of (i) to (iv).

Embodiment 4 relates to the method of any one of Embodiments 1-3, further comprising determining a desired width and/or desired period length of the coiled filament, wherein the distance and/or the speed are selectively controlled in step II) such that the width of the coiled filament is the desired width and/or the period length of the coiled filament is the desired period length.

Embodiment 5 relates to the method of Embodiment 4, further comprising first plotting for the nozzle and the first composition speed as a function of distance when printing the first composition with the nozzle for establishing parameters to selectively control the distance and/or the speed in II).

Embodiment 6 relates to the method of any one of Embodiments 1-5, wherein: (i) the plurality of voids are open-celled; (ii) the plurality of voids are closed-celled; or (iii) a combination of (i) and (ii).

Embodiment 7 relates to the method of any one of Embodiments 1-6, wherein step III) is carried out prior to repeating steps I) and II) with independently selected compositions.

Embodiment 8 relates to the method of any one of Embodiments 1-7, wherein the solidification condition is selected from: (i) exposure to moisture; (ii) exposure to heat; (iii) exposure to irradiation; (iv) reduced ambient temperature; (v) exposure to solvent; (vi) exposure to mechanical vibration; any combination of (i) to (vi).

Embodiment 9 relates to the method of any one of Embodiments 1-8, wherein: (i) the first composition comprises (a) a silicone composition, (b) a polymer, (c) a metal, (d) a slurry, or (e) combinations thereof; or (ii) the first composition comprises a silicone composition selected from: (a) hydrosilylation-curable silicone compositions; (b) condensation-curable silicone compositions; (c) free-radical-curable silicone compositions; and (d) ring opening reaction-curable silicone compositions.

Embodiment 10 relates to the method according to any one of Embodiments 1-9, wherein: (i) the apparatus comprises a 3D printer; or (ii) the apparatus comprises a 3D printer selected from a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

Embodiment 11 relates to a porous three-dimensional (3D) article formed in accordance with the method of any one of Embodiments 1-10.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims. Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples, illustrating compositions and their reaction products, are intended to illustrate and not to limit the invention.

General Procedure:

In each of the Examples below, a porous 3D article is formed in accordance with the inventive method. Specifically, the porous 3D article is formed with an apparatus (constructed from a Preeflow® eco-PEN 450 dispenser including a nozzle and an eco-CONTROL controller, each available from ViscoTec Pumpen-u. Dosiertechnik GmbH of Töging am Inn, Germany) in a humidity controlled enclosure (acrylic plastic) having a humidity of around 50%. The apparatus includes a nozzle tip (SmoothFlow™ Tapered Tip, available from Nordson Corporation of Weslake, Ohio) having a diameter ($D_n$) connected to the nozzle of the dispenser. A first composition (737 Neutral Cure Sealant, an oxime cure silicone sealant, available from Dow Corning Corporation of Midland, Mich.) is introduced to the dispenser via an air pressurized syringe barrel (clear Optimum®, also available from Nordson Corporation) and printed onto a substrate (295×295 mm glass or aluminum flat build plate) with the nozzle of the apparatus to form a first filament. During printing of the first composition, the substrate and the nozzle are spaced apart by a selectively controlled distance (H), and at least one of the substrate and the nozzle is moved at a selectively controlled speed ($U_0$) relative to the other such that the filament coils on the substrate to give a first layer comprising a coiled filament having a width (W) and a period length (P) on the substrate. The first layer is then exposed to a solidification condition to form the porous 3D article.

Preparation Examples 1-6

Porous 3D articles are prepared according to the General Procedure above. In each of Preparation Examples 1-6, the coiled filament is visually inspected and assigned a coiling pattern during the printing of the first composition onto the substrate. Table 1 below sets forth the various parameters utilized in Preparation Examples 1-6, as well as the coiling pattern observed during the associated printing step thereof.

TABLE 1

| Preparation Example | Diameter ($D_N$) (inch) | Distance (H) (mm) | Speed ($U_0$) (mm/s) | Coiling Pattern |
| --- | --- | --- | --- | --- |
| PE1 | 0.016 | 30 | 16 | Steady |
| PE2 | 0.016 | 30 | 9 | Meandering |
| PE3 | 0.016 | 30 | 8 | Figure-of-8 |
| PE4 | 0.016 | 30 | 5 | Coiling |
| PE5 | 0.016 | 45 | 10 | Coiling |
| PE6 | 0.016 | 39 | 9 | Sidekicks |

A picture of the coiling patterns observed for Preparation Examples 1-6 is shown in FIGS. 5.1-5.6, respectively.

Preparation Examples 7-10

Porous 3D articles are prepared according to the General Procedure above. Table 2 below sets forth the various parameters utilized in Preparation Examples 7-10.

TABLE 2

| Preparation Example | Diameter ($D_N$) (inches) | Distance (H) (mm) | Speed (H0) (mm/s) |
| --- | --- | --- | --- |
| PE7 | 0.016 | 6-51 | 16-1 (decrease) |
| PE8 | 0.016 | 6-51 | 1-16 (increase) |
| PE9 | 0.047 | 6-51 | 16-1 (decrease) |
| PE10 | 0.047 | 6-51 | 1-16 (increase) |

In each of Preparation Examples 7-10, the coiled filament is visually inspected and assigned a coiling pattern at varying distances (H) and ($U_0$). The coiling patterns, distances (H), and speeds ($U_0$) are then analyzed to determine whether the filament exhibits a boundary between the observed coiling patterns at the varying distances (H) and speeds ($U_0$). In particular, the coiling patterns, distances (H), and speeds ($U_0$) are plotted against one another in a regime diagram, as described in further detail below. The regime diagrams for Preparation Examples 7-10 are shown in FIGS. 6.1-6.4, respectively. In each regime diagram, the plotted lines A-C represent the boundaries between the observed coiling patterns (as described with regard to Preparation Examples 1-6, and shown in FIG. 5). In particular, line A represents a boundary between steady non-coiling deposition and unsteady coiling patterns, line B represents a boundary between unsteady and figure-of-8 coiling patterns, and line C represents a boundary between figure-of-8 and steady coiling patterns. Between lines A and B, three different unsteady coiling Zones are observed: Meandering Zones, Sidekicks Zones, and Uncertain Zones.

The regime diagrams for each nozzle diameter ($D_N$) are then overlaid to create a combined regime diagram, which are analyzed to determine operational windows. In particular, the regime diagram for Preparation Example 7 is overlaid with the regime diagram for Preparation Example 8 to form combined regime diagram 7-8, which is shown in FIG. 6.5. Likewise, the regime diagram for Preparation Example 9 is overlaid with the regime diagram for Preparation Example 10 to form combined regime diagram 9-10, which is shown in FIG. 6.6. In each of the combined regime diagrams, Hysteresis Zones are observed between experiments of increasing or decreasing the speed of travel of the nozzle relative to the substrate plate, where the distribution of steady coiling, figure-of-8 coiling, unsteady coiling, and steady non-coiling Zones are not coincident with one another.

In general, each of FIGS. 6.1-6.6 illustrates and exemplary example of a plot for a particular nozzle diameter ($D_N$) and composition. Speed ($U_0$) is plotted as a function of distance (H) for the particular nozzle diameter ($D_N$) and composition. As clearly shown in FIG. 6, for the particular nozzle and composition analyzed, a steady coiling zone occurred at lesser speeds than those associated with a steady non-coiling zone. Between the steady non-coiling zone, where coiling is not exhibited, and the steady coiling zone, where coiling is predictably exhibited, exist unpredictable coiling zones. These unpredictable coiling zones may result in formation of one or more figures-of-eight, meandering, and/or side kicking of the coils formed by the filament. Distribution of zones is not merely coincident, as there are some hysteresis zones, depending on how the speed of nozzle travel is changed. For the purposes of the inventive method, printing may be associated with predictable coiling as exhibited, and/or with unpredictable coiling.

Each of FIGS. 6.1-6.6 is merely an exemplary example of plotting for a known nozzle diameter ($D_N$), known composition (and viscosity thereof), with speed ($U_0$) as a function of distance (H). As such, the plots of FIG. 6 are illustrative of how to establish parameters to selectively control the distance and/or the speed during printing. When or if the same nozzle and first composition are printed again, this trial plotting may not be needed as this information is already generally known. Selectively controlling the speed and/or distance results in the width (W) of the coiled filament being the desired width (W) and/or the period length (P) of the coiled filament being the desired period length (P).

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of forming a porous three-dimensional (3D) article with an apparatus having a nozzle, said method comprising:
   I) printing a first composition on a substrate with the nozzle of the apparatus to form at least one first filament comprising the first composition;
   wherein the substrate and the nozzle are spaced a distance from one another and at least one of the substrate and the nozzle is moved at a speed relative to the other during step I);
   II) selectively controlling the distance and/or the speed such that the at least one first filament coils on the substrate to give a first layer on the substrate, the first layer comprising a coiled filament, wherein the coiled filament has a width and a period length;
   optionally, repeating steps I) and II) with independently selected composition(s) for any additional layer(s); and
   III) exposing the layer(s) to a solidification condition;
   wherein the porous three-dimensional (3D) article defines a plurality of voids; and
   wherein selectively controlling the speed and/or distance in step II) comprises:
      first plotting coiling patterns, distance, and speed to give a regime diagram; and
      determining a steady coiling zone in the regime diagram such that formation of the coiled filament comprises predictable coiling.

2. The method of claim 1, further comprising:
   IV) printing a second composition with the nozzle of the apparatus to form at least one second filament comprising the second composition on the first layer;
   wherein the first layer and the nozzle are spaced a distance from one another and at least one of the substrate and the nozzle is moved at a speed relative to the other during step IV);
   V) selectively controlling the distance and/or the speed such that the at least one second filament coils on the first layer to give a second layer on the first layer, the second layer comprising a second coiled filament, wherein the second coiled filament has a width and a period length.

3. The method of claim 2, wherein: (i) the plurality of voids are defined by at least the first and second filaments; (ii) the first and second filaments are the same and continuous with one another; (iii) at least the first and second filaments include the plurality of voids; (iv) the first and/or second filaments are hollow; or (v) any combination of (i) to (iv).

4. The method of claim 1, further comprising determining a desired width and/or desired period length of the coiled filament, wherein the distance and/or the speed are selectively controlled in step II) such that the width of the coiled filament is the desired width and/or the period length of the coiled filament is the desired period length.

5. The method of claim 4, further comprising first plotting for the nozzle and the first composition speed as a function of distance when printing the first composition with the nozzle for establishing parameters to selectively control the distance and/or the speed in II).

6. The method of claim 1, wherein: (i) the plurality of voids are open-celled; (ii) the plurality of voids are closed-celled; or (iii) a combination of (i) and (ii).

7. The method of claim 1, wherein step III) is carried out prior to repeating steps I) and II) with independently selected compositions.

8. The method of claim 1, wherein the solidification condition is selected from: (i) exposure to moisture; (ii) exposure to heat; (iii) exposure to irradiation; (iv) reduced ambient temperature; (v) exposure to solvent; (vi) exposure to mechanical vibration; any combination of (i) to (vi).

9. The method of claim 1, wherein the first composition comprises a silicone composition selected from: (a) hydrosilylation-curable silicone compositions; (b) condensation-curable silicone compositions; (c) free-radical-curable silicone compositions; and (d) ring opening reaction-curable silicone compositions.

10. The method according to claim 1, wherein the apparatus comprises a 3D printer selected from a fused filament fabrication printer, a fused deposition modeling printer, a direct ink deposition printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

11. A porous three-dimensional (3D) article formed in accordance with the method of claim 1.

* * * * *